US012754937B2

(12) United States Patent
Gupta et al.

(10) Patent No.: US 12,754,937 B2
(45) Date of Patent: Oct. 6, 2026

(54) AUTOMATED USER INTERFACE FEEDBACK BASED GENERATIVE AI SYSTEMS

(71) Applicant: QUALCOMM Incorporated, San Diego, CA (US)

(72) Inventors: Vikram Gupta, San Diego, CA (US); Wesley James Holland, Encinitas, CA (US); Ziad Asghar, San Diego, CA (US); Vinesh Sukumar, Fremont, CA (US); Roland Memisevic, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/492,480

(22) Filed: Oct. 23, 2023

(65) Prior Publication Data

US 2025/0131020 A1 Apr. 24, 2025

(51) Int. Cl.
*G06F 7/00* (2006.01)
*G06F 16/332* (2019.01)
*G06F 16/335* (2019.01)

(52) U.S. Cl.
CPC ........ *G06F 16/3328* (2019.01); *G06F 16/335* (2019.01)

(58) Field of Classification Search
CPC ........................... G06F 16/3328; G06F 16/335
USPC .................................................. 707/600–899
See application file for complete search history.

(56) References Cited

U.S. PATENT DOCUMENTS

| | | | | |
|---|---|---|---|---|
| 12,001,462 | B1 * | 6/2024 | Madisetti | G06F 40/284 |
| 12,093,655 | B1 * | 9/2024 | Montenegro | G06F 40/35 |
| 2014/0324749 | A1 * | 10/2014 | Peters | G09B 7/04 706/46 |
| 2022/0374099 | A1 * | 11/2022 | Livny | G06N 3/084 |
| 2023/0249599 | A1 * | 8/2023 | Nicola | B60N 2/56 297/284.6 |
| 2023/0411008 | A1 * | 12/2023 | Khanzada | G16H 10/65 |

OTHER PUBLICATIONS

Bao K., et al., “TALLRec: An Effective and Efficient Tuning Framework to Align Large Language Model with Recommendation”, Proceedings of the ACM SIGCOMM 2023 Conference, ACMPUB27, New York, NY, USA, Sep. 14, 2023, pp. 1007-1014, XP059427611, Sections 1, 2.

Chen Z., “PALR: Personalization Aware LLMs for Recommendation”, Arxiv.Org, Cornell University Library, 201 Olin Library Cornell University Ithaca, NY, 14853, May 12, 2023, pp. 1-7, XP091506776, Sections 1, 2.

(Continued)

*Primary Examiner* — Isaac M Woo
(74) *Attorney, Agent, or Firm* — Polsinelli LLP

(57) ABSTRACT

Various embodiments include systems and methods for improving the user experience with LXMs. A computing device may be configured to receive a user prompt, observe user responses to an output received from a LXM in response to a prompt that is at least partially based on the user's prompt, and take an action to improve the user's experience with the LXM based on the observed user response.

30 Claims, 14 Drawing Sheets

(56) References Cited

OTHER PUBLICATIONS

Dong Z., et al., "MuseChat: A Conversational Music Recommendation System for Videos", arXiv:2310.06282v2 [cs.LG], ARxiv. Org, Cornell University Library, 201 Olin Library Cornell University Ithaca, NY, 14853, Oct. 11, 2023, pp. 1-19, XP091632744, Sections 1, 3, 4.
Friedman L., et al., "Leveraging Large Language Models in Conversational Recommender Systems", arXiv:2305.07961v1 [cs.IR], Arxiv.Org, Cornell University Library, 201 Olin Library Cornell University Ithaca, NY, 14853, May 13, 2023, pp. 1-24, XP091508274, The Whole Document.
International Search Report and Written Opinion—PCT/US2024/045527—ISA/EPO—Jan. 13, 2025.

* cited by examiner

AUTOMATED USER INTERFACE FEEDBACK BASED GENERATIVE AI SYSTEMS

BACKGROUND

Recent advancements in artificial intelligence (AI) and machine learning (ML) technologies have led to the development of increasingly sophisticated models capable of understanding and interpreting complex data structures. These models, commonly known as large generative AI models (LXMs), have a multitude of applications that span across various domains, from natural language processing to computer vision and speech recognition. Their efficacy stems from their ability to learn from massive datasets, gaining an unprecedented depth of understanding and applicability.

The increasing capabilities of LXMs, including (but not limited to) Large Language Models (LLMs), Large Speech Models (LSMs), and Large Vision Models (LVMs) (which are also referred to as Language Vision Models or Vision Language Models (VLMs)), offer enhanced functionality in various applications such as natural language understanding, speech recognition, visual analysis, text generation, speech generation, image generation, and/or the like. Among the diverse types of LXMs, LLMs are generally known for their capabilities in understanding and generating human language these models may be trained on extensive textual datasets and may perform such tasks as machine translation, text summarization, question-answering, and/or the like. LLMs have found applications in a broad range of industries including healthcare, finance, and customer service, among others.

An LSM is a type of LXM specializing in processing and understanding auditory data. LSMs may translate spoken language into textual form and vice versa. LSMs excel at tasks such as speech-to-text conversion, voice recognition, natural language understanding within a spoken context, providing spoken word responses in machine-generated voices, and/or the like. The efficacy of LSMs lies in their capacity to learn from enormous datasets containing diverse accents, dialects, and languages.

An LVM is a LXM that is trained to interpret and analyze visual data. LVM models may use convolutional neural networks or similar architectures to process visual inputs and derive meaningful conclusions from them. From image classification to object detection and generating new images in response to natural language prompts, LVMs are growing in popularity and use in diverse areas such as medical imaging, autonomous vehicles, surveillance systems, advertising, and entertainment.

SUMMARY

Various aspects include methods performed by a computing device for improving the user experience with a large generative artificial intelligence model (LXM), which may include receiving a user's prompt, observing user responses to an output received from a LXM in response to a prompt that may be at least partially based on the user's prompt, and taking an action to improve the user's experience with the LXM based on the observed user response.

Some aspects may include obtaining user context information from a source of physical context information in the computing device, selecting a user profile from among a plurality of user profiles based on the user context information and the user's prompt, generating an enhanced prompt based on the user's prompt and information included in the selected user profile, and submitting the enhanced prompt to the LXM, in which taking an action to improve the user's experience with the LXM may include updating the selected user profile based on the observed user response.

Some aspects may further include identifying, based on observing user responses, one or more portions of the output received from the LXM that elicited positive, negative, or neutral user responses, submitting a prompt to the LXM inquiring about prompt parameters or content characteristics that resulted in positive, negative, or neutral user responses of the identified one or more portions of the output, and updating the selected user profile based on information on prompt parameters received from the LXM to include or increase prompt parameters that elicited positive user responses and remove or reduce prompt parameters that elicited negative user responses.

Some aspects may further include obtaining user context information from a source of physical context information in the computing device, selecting a LXM from a plurality of LXMs based on the user context information and the user's prompt, and submitting to the selected a prompt that may be at least partially based on the user's prompt, in which taking an action to improve the user's experience with the LXM may include providing feedback configured to enable fine tuning of the selected LXM based on the observed user response to the output received from the selected LXM.

In some aspects, the selected LXM may be hosted on the computing device, the method further which may include fine tuning the selected LXM on the computing device based on the observed user response to the output received from the selected LXM. In some aspects, the plurality of LXMs may be adapted for different user profiles and user context. In some aspects, selecting a LXM from a plurality of LXMs based on the user context information and the user's prompt may include selecting one of the plurality of LXMs that may be adapted for the determined location of the user. In some aspects, selecting a LXM from a plurality of LXMs based on the user context information and the user's prompt may include selecting one of the plurality of LXMs that may be adapted for the determined activity of the user.

Some aspects may further include obtaining user context information from a source of physical context information in the computing device, selecting a user profile from among a plurality of user profiles based on the user context information and the user's prompt, selecting a LXM from a plurality of LXMs based on the user context information and the user's prompt, generating an enhanced prompt based on the user's prompt, information included in the selected user profile, and the selected LXM, and submitting the enhanced prompt to the selected LXM, in which taking an action to improve the user's experience with the LXM may include updating the selected user profile based on the observed user response, and providing feedback configured to enable fine tuning of the selected LXM based on the observed user response.

Further aspects may include a computing device having a at least one processor configured with processor-executable instructions to perform various operations corresponding to the methods summarized above. Further aspects may include a non-transitory processor-readable storage medium having stored thereon processor-executable instructions configured to cause a at least one processor to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
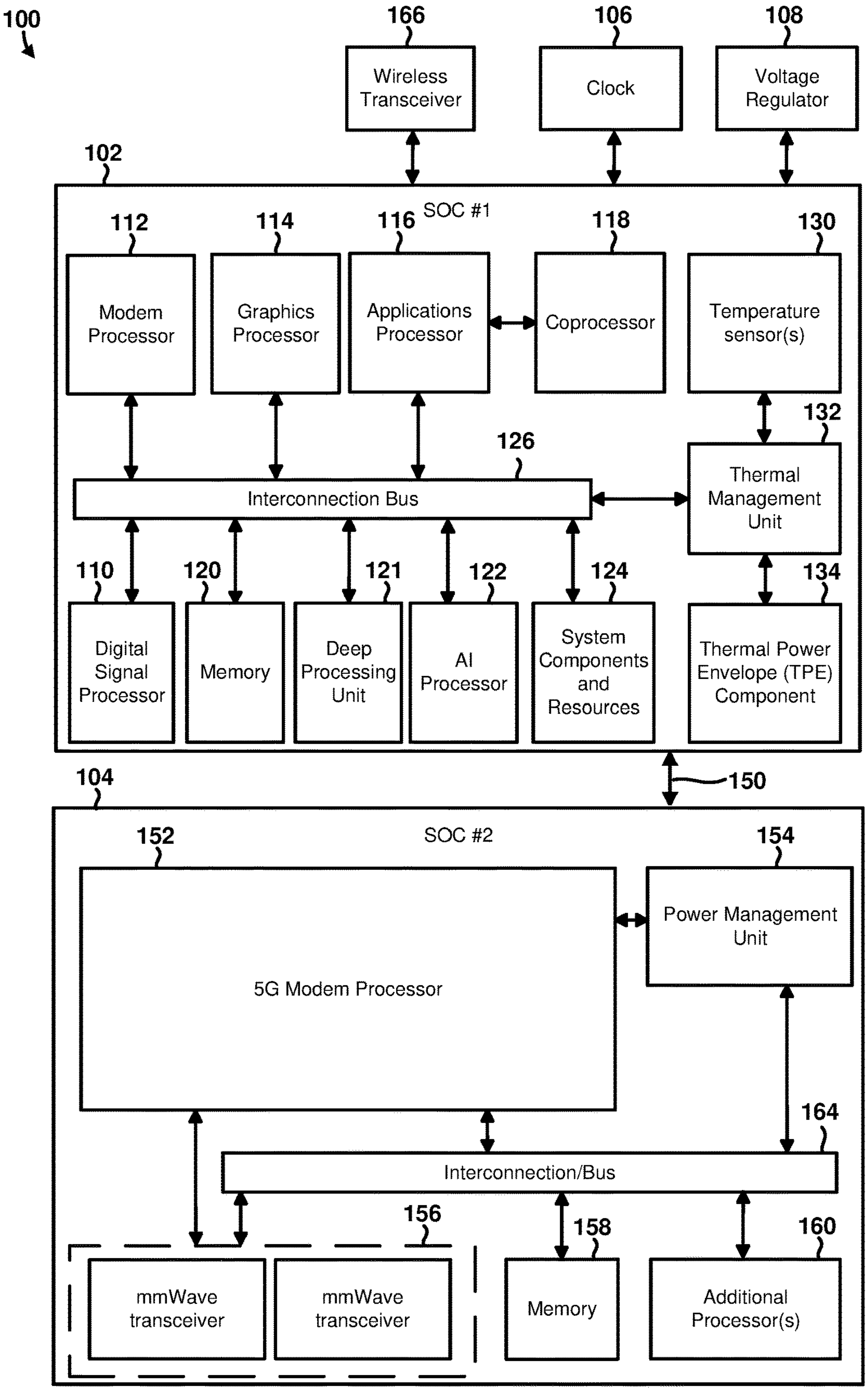
FIG. 1A is a component block diagram illustrating example components in system in package (SIP) that may be included in a computing device and configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices and processing systems or at least one processor configured to implement the methods, of improving the user experience with large generative AI model (LXM) systems, such as a large language model (LLM), large speech model (LSMs), large/language vision model (LVM), hybrid model, multi-modal model, etc. In some embodiments, the processing system may be configured to evaluate and improve the quality of interaction between a user computing device and an LXM based on multi-modal data collected from a variety of sensory inputs, such as auditory signals, visual cues, motion-related metrics, geographical indicators, physiological measures, neurophysiological inputs, and tactile feedback.

In some embodiments, the processing system (or at least one processor) may be configured to observe user responses to outputs from an LXM and take responsive actions (e.g., update user profiles, fine-tune the LXM, etc.). For example, the processing system may be configured to receive a user prompt, observe user responses to an output received from an LXM in response to a prompt that is at least partially based on the user prompt, and perform a responsive action (e.g., update a selected user profile based on the observed user response, provide feedback configured to enable fine-tuning of a selected LXM based on an observed user response to output received from the selected LXM, etc.) to improve the user experience with the LXM based on the observed user response. In some embodiments, all or portions of the LXM may be hosted on the user device, which may offer advantages such as reduced latency and enhanced data privacy.

In some embodiments, the processing system may be configured to generate an enhanced prompt for the LXM based on a user profile. In some embodiments, the user profile may be selected from a plurality of user profiles based on user context information obtained from the user device, physical context information, prompts previously issued to the LXM, or other similar factors, conditions, or considerations. In some embodiments, the processing system may be configured to modify user profiles by using a result of analyzing the user's past reactions to previous LXM-generated content to revise or remove certain prompt parameters in order to align the user profile more closely with the user's preferences. The prompt parameters may include LXM parameters, profile parameters, contextual parameters, etc.

In some embodiments, the processing system may be configured to use a multi-faceted approach to augment the user experience with the LXMs. The processing system may perform personalization operations that include fine-tuning the LXMs and/or the user profiles to create a more tailored interaction. The processing system may perform real-time analysis operations that include monitoring the user's reactions to the outputs generated by the LXM and adjusting the way in which the LXM interacts with the user based on whether the reactions are favorable or unfavorable. The processing system may perform context-sensitive operations that include gathering user context information from multiple sources embedded within the computing device, combining the contextual data with a user prompt, using the combination to select a suitable user profile, and generating an enhanced LXM prompt based on the selected user profile.

The term "computing device" is used herein to refer to (but not limited to) any one or all of personal computing devices, personal computers, workstations, laptop computers, Netbooks, Ultrabook, tablet computers, mobile communication devices, smartphones, user equipment (UE), personal data assistants (PDAs), palm-top computers, wireless electronic mail receivers, multimedia internet-enabled cellular telephones, media and entertainment systems, gaming systems (e.g., PlayStation™, Xbox™, Nintendo Switch™), media players (e.g., DVD players, Roku™, apple TV™), digital video recorders (DVRs), portable projectors, 3D holographic displays, wearable devices (e.g., earbuds, smartwatches, fitness trackers, augmented reality (AR) glasses, head-mounted displays, etc.), vehicle systems such as drones, automobiles, motorcycles, connected vehicles, electric vehicles, automotive displays, advanced driver-assistance systems (ADAS), etc., cameras (e.g., surveillance cameras, embedded cameras), smart devices (e.g., smart light bulbs, smartwatches, thermostats, smart glasses, etc.), Internet of Things (IoT) devices, other similar devices that include a programmable processing system that may be configured to provide the functionality of various embodiments.

The term "processing system" is used herein to refer to one or more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) is used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

The term "neural network" is used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" is used herein to refer to a process that is performed at runtime or during the execution of the software application program corresponding to the neural network. Inference may include traversing the processing nodes in the neural network along a forward path to produce one or more values as an overall activation or overall "inference result."

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input and final layer may be referred to as intermediate layers, hidden layers, or black-box layers.

Each layer in a neural network may have multiple inputs and thus multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer and multiple preceding layers.

The term "recurrent neural network" (RNN) is used herein to refer to a class of neural networks particularly well-suited for sequence data processing. Unlike feedforward neural networks, RNNs may include cycles or loops within the network that allow information to persist. This enables RNNs to maintain a "memory" of previous inputs in the sequence, which may be beneficial for tasks in which temporal dynamics and the context in which data appears are relevant.

The term "long short-term memory network" (LSTM) is used herein to refer to a specific type of RNN that addresses some of the limitations of basic RNNs, particularly the vanishing gradient problem. LSTMs include a more complex recurrent unit that allows for the easier flow of gradients during backpropagation. This facilitates the model's ability to learn from long sequences and remember over extended periods, making it apt for tasks such as language modeling, machine translation, and other sequence-to-sequence tasks.

The term "transformer" is used herein to refer to a specific type of neural network that includes an encoder and/or a decoder and is particularly well-suited for sequence data processing. Transformers may use multiple self-attention components to process input data in parallel rather than sequentially. The self-attention components may be configured to weigh different parts of an input sequence when producing an output sequence. Unlike solutions that focus on the relationship between elements in two different sequences, self-attention components may operate on a single input sequence. The self-attention components may compute a weighted sum of all positions in the input sequence for each position, which may allow the model to consider other parts of the sequence when encoding each element. This may offer advantages in tasks that benefit from understanding the contextual relationships between elements in a sequence, such as sentence completion, translation, and summarization. The weights may be learned during the training phase, allowing the model to focus on the most contextually relevant parts of the input for the task at hand. Transformers, with their specialized architecture for handling sequence data and their capacity for parallel computation, often serve as foundational elements in constructing large generative AI models (LXM).

The term "large generative AI model" (LXM) is used herein to refer to an advanced computational framework that includes any of a variety of specialized AI models including, but not limited to, large language models (LLMs), large speech models (LSMs), large/language vision models (LVMs), vision language models (VLMs)), hybrid models, and multi-modal models. An LXM may include multiple layers of neural networks (e.g., RNN, LSTM, transformer, etc.) with millions or billions of parameters. Unlike traditional systems that translate user prompts into a series of correlated files or web pages for navigation, LXMs support dialogic interactions and encapsulate expansive knowledge in an internal structure. As a result, rather than merely serving a list of relevant websites, LXMs are capable of providing direct answers and/or are otherwise adept at various tasks, such as text summarization, translation, complex question-answering, conversational agents, etc. In various embodiments, LXMs may operate independently as standalone units, may be integrated into more comprehensive systems and/or into other computational units (e.g., those found in a SoC or SIP, etc.), and/or may interface with specialized hardware accelerators to improve performance metrics such as latency and throughput. In some embodiments, the LXM component may be enhanced with or configured to perform an adaptive algorithm that allows the LXM to better understand context information and dynamic user behavior. In some embodiments, the adaptive algorithms may be performed by the same processing system that manages the core functionality of the LXM and/or may be distributed across multiple independent processing systems.

The term "enhanced prompt" is used herein to refer to a prompt that is generated for submission to an LXM based upon a received user prompt but with additional information, such as information from a user profile, detailed explanations for select topics, and/or the like as described herein. In some cases, an enhanced prompt may be shorter than the received user prompt, such as when the generated prompt summarizes the user's intent or removes or replaces words or phrases for prompting the LXM, such as to obfuscate personalized user data and/or to not include sensitive or private personal information.

The term "embedding layer" is used herein to refer to a specialized layer within a neural network, typically at the input stage, that transforms discrete categorical values or tokens into continuous, high-dimensional vectors. An embedding layer may operate as a lookup table in which each unique token or category is mapped to a point in a continuous vector space. The vectors may be refined during the model's training phase to encapsulate the characteristics or attributes of the tokens in a manner that is conducive to the tasks the model is configured to perform.

The term "token" is used herein to refer to a unit of information that an LXM may read as a single input during training and inference. Each token may represent any of a variety of different data types. For example, in text-centric models such as in LLMs, each token may represent a one or more textual element such as a paragraph(s), sentence(s), clause(s), word(s), sub-word(s), character(s), etc. In models designed for auditory data, such as LSMs, each token may represent a feature extracted from audio signals, such as a phoneme, spectrogram, temporal dependency, Mel-frequency cepstral coefficients (MFCCs) that represent small segments of an audio waveform, etc. In visual models such as LVM, each token may correspond to a portion of an image (e.g., pixel blocks), sequences of video frames, etc. In hybrid systems that combine multiple modalities (text, speech, vision, etc.), each token may be a complex data structure that encapsulates information from various sources. For example, a token may include both textual and visual information, each of which independently contributes to the token's overall representation in the model.

There are generally limitations on the total number of tokens that may be processed by AI models. As an example, a model with a limitation of 512 tokens may alter or truncate input sequences that go beyond this specific count.

Each token may be converted into a numerical vector via the embedding layer. Each vector component (e.g., numerical value, parameter, etc.) may encode an attribute, quality, or characteristic of the original token. The vector components may be adjustable parameters that are iteratively refined during the model training phase to improve the model's performance during subsequent operational phases. The numerical vectors may be high-dimensional space vectors (e.g., containing more than 300 dimensions, etc.) in which each dimension in the vector captures a unique attribute, quality, or characteristic of the token. For example, dimension 1 of the numerical vector may encode the frequency of a word's occurrence in a corpus of data, dimension 2 may represent the pitch or intensity of the sound of the word at its utterance, dimension 3 may represent the sentiment value of the word, etc. Such intricate representation in high-dimensional space may help the LXM understand the semantic and syntactic subtleties of its inputs. During the operational phase, the tokens may be processed sequentially through layers of the LXM or neural network, which may include structures or networks appropriate for sequence data processing, such as transformer architectures, recurrent neural networks (RNNs), or long short-term memory networks (LSTMs).

The term "sequence data processing" is used herein to refer to techniques or technologies for handling ordered sets of tokens in a manner that preserves their original sequential relationships and captures dependencies between various elements within the sequence. The resulting output may be a probabilistic distribution or a set of probability values, each corresponding to a "possible succeeding token" in the existing sequence. For example, in text completion tasks, the LXM may suggest the possible succeeding token determined to have the highest probability of completing the text sequence. For text generation tasks, the LXM may choose the token with the highest determined probability value to augment the existing sequence, which may subsequently be fed back into the model for further text production.

Cellular and wireless communication technologies have grown exponentially over the past several years. This growth has been fueled by better communications, hardware, larger networks, and more reliable protocols. Wireless service providers now offer their customers an ever-expanding array of features and services and provide users unprecedented access to information, resources, and communications. To keep pace with these service enhancements, mobile electronic devices (e.g., smartphones, wearables, etc.) have become more powerful and complex than ever. For example, mobile electronic devices now commonly include system-on-chips (SoCs), multiple microprocessor cores, and multi-modal sensors encompassing auditory, visual, and inertial measurement capabilities.

Similarly, voice-activated computing systems that interact with users through vocal commands or queries have grown in popularity and use. These systems rely on a combination of microphone hardware and natural language processing software to capture and interpret human speech. Upon receiving specific voice prompts or keywords, the voice-activated system may transition from a passive listening state to an active state in which it may execute tasks, provide information, or perform various functions. Generally, such systems facilitate user interaction with devices or software applications by replacing or supplementing manual input methods such as typing or clicking. Voice-activated computing systems' capabilities may range from simple task execution to more complex conversational interactions.

Concurrent with these trends, advancements in artificial intelligence (AI) and machine learning (ML) have led to the development of models that are highly adept at interpreting intricate data structures. LXMs now have applications in a myriad of fields, from natural language processing to computer vision and auditory data interpretation. The efficacy of these LXMs stems from their advanced learning mechanisms, honed through training on expansive datasets, allowing them to achieve a broad spectrum of understanding and applicability. Within this broad category, LLMs have garnered particular interest for their capabilities in both comprehending and generating human language. LSMs form another notable subclass of LXMs, specializing in processing auditory information for tasks such as speech-to-text conversion and voice identification. LVMs/VLMs are yet another subcategory that focuses on the analysis and interpretation of visual data.

The multi-modal sensors integrated into user-end devices offer valuable data that could illuminate user interactions with LXM systems. Such data may include real-time indicators of emotional states, facial expressions, and levels of attentiveness, serving as a rich source of feedback for enhancing user experiences. However, there are several considerations related to privacy and security that might constrain the extent to which this abundant sensor data could be effectively utilized in conjunction with LXM systems.

The various embodiments include a computing system that is equipped with components configured to improve the efficacy of and user experience with LXMs. The computing system may be configured to accept a user prompt, interpret the user prompt, and monitor the user's responses to the outputs generated by the LXM. Based on the user reactions or responses, the computing system may make strategic decisions and/or perform select actions to refine and enhance the user's interaction with the LXM. For example, in some embodiments, the computing system may be configured to receive a user prompt, observe user responses to an output received from an LXM in response to a prompt that may be at least partially based on the user prompt, and take an action to improve the user experience with the LXM based on the observed user response. In some embodiments, the computing system may be further configured to obtain user context information from a source of physical context information in the computing system, select a user profile from among a plurality of user profiles based on the user context information and the user prompt, generate an enhanced prompt based on the user prompt and information included in the selected user profile, submit the enhanced prompt to the LXM, and update the selected user profile based on the observed user response. Thus, the computing system may generate an enhanced prompt that is influenced by the user prompt and the information from the chosen user profile.

In some embodiments, the computing system may be configured to perform context-based and/or profile-based automation operations, which may include collecting, generating, updating and/or using context information and user profile information to generate enhanced prompts and/or otherwise improve the user experience.

Due to considerations such as privacy, security, and data retrieval latency, personalized user data may be predominantly stored on the user end device. In some embodiments, the computing system (user end device) may be configured to collect and use personalized user data and historical user data (e.g., previous prompts, iterative prompt modifications, web navigation patterns, social media interactions, user-specified configurations, etc.) to generate a personalized user profile for the user and generate enhanced prompts for the LXM system based on the user profiles. In some embodiments, the computing device may generate the enhanced prompts so that they obfuscate the personalized user data and/or do not include sensitive or private personal information.

In some embodiments, the computing system may be configured to generate the user profiles to include attributes for characterizing and understanding the unique preferences, behaviors, and needs of each user. For example, a user profile may include an age attribute, response length attribute, response flavor attribute, and a temperature attribute. The age attribute may be used to distinguish between a child or adult user, to modulate content appropriateness, etc. The response length attribute may be used to determine whether outputs should be brief or comprehensive. The response flavor attribute may be used for adjusting the tone to be relaxed, professional, etc. based on the user's preference. The temperature attribute may be used to adjust the output style to be more logical or creative based on user preferences.

In some embodiments, the computing system may be configured to distinguish and differentiate between individual user profiles to manage multiple users accessing and using the same user end device. In some embodiments, the computing system may be configured to generate and continuously update the user profiles.

In some embodiments, the computing system may be configured to generate context information that may be used to evaluate the context in which the user interacts with the LXM. For example, the context information may include a motion attribute, a setting attribute, a usage attribute, a display device resolution attribute, a display device type attribute, and a priority attribute. The motion attribute may be used for differentiating between a mobile or stationary user. The setting attribute may be used for recognizing if the user is in a professional or personal environment. The usage attribute may be used for categorizing the intent as business, entertainment, or education. The display device resolution attribute may be used for adjusting for visual clarity whether the device supports, for example, 4k or a 1080p resolution. The display device type attribute may be used for adapting content based on whether the content is viewed, for example, on a large screen or a small handheld device. The priority attribute may be used for determining whether the user needs information that is time-critical or may be processed in non-real-time.

In some embodiments, the computing system and/or the LXM system may be configured to recognize and interpret a variety of inputs beyond conventional text prompts. In some embodiments, the computing system may be configured to generate prompts, images, signals, details, information, instructions, directives, cues, or other forms of input for the LXM system based on user profiles and contextual information to select a suitable model (LXM, etc.) for content generation and/or otherwise influence the responses generated by the LXM system so that the LXM-generated content is more relevant to the user.

In some embodiments, the computing system may be configured to capture information that characterizes user interactions with LXM-generated content, extract metrics such as engagement time and user reactions to distinct sections of the content and send the extracted metrics to the LXM system as feedback.

In some embodiments, the computing system may be configured to collect information from diverse data sources, including but not limited to microphones, cameras, GPS, IMU, keyboards, touchscreens, brain-computer interfaces, controllers, eye trackers, haptic sensors, heart rate monitors, etc. In some embodiments, the computing system may be configured to process and categorize this raw input data into specific types such as audio data, image/video streams, locational coordinates, motion data, textual data, electroencephalograph (EEG) data, heart rate metrics, and gaze information. In some embodiments, the computing system may be configured to monitor and evaluate the types of data used in creating user profiles, the inputs that are most significant or influential in user profile creation, and/or changes in user preferences, and adjust user profiles based on the evaluation results and/or their interactions with the LXM-generated content.

In some embodiments, the computing system may be configured to repeatedly review and update the factors and elements used to determine user context and evaluate the extent to which these contextual factors/elements influence the LXM system and the LXM-generated content.

In some embodiments, the computing system may be configured to identify specific components of the LXM system, such as inputs, outputs, models, and filters, that are most responsive to changes or adjustments in user profile and context data.

In some embodiments, the computing system may be configured to collect data from the sensing hub related to user interactions, autonomously infer feedback elements from the LXM-generated content and send the feedback to the LXM system.

In some embodiments, the computing system may be configured to gather or generate user interface statistics characterizing the user's engagement with the LXM-generated content and determine correlations between the user interface statistics and the LXM-generated content. In some embodiments, the computing system may be configured to extract feedback from LXM-generated content without user intervention and send the extracted feedback to the LXM system for future refinements.

In some embodiments, the computing system may be configured to analyze both implicit and explicit feedback from users; use the results of the analysis to update user profiles, LXM parameters, the enhanced prompt, and/or the feedback that is sent to the LXM system; generate LXM prompts (e.g., enhanced prompts) based on the updated user profile and context data; use the generated prompts to receive LXM-generated content that is tailored to the current user profile; and present the tailored LXM-generated content to the user.

In some embodiments, the computing system may be configured to cycle through the stages of feedback collection and content generation to perpetually or repeatedly refine the relevance and personalization of the LXM-generated content.

In some embodiments, the computing system may be configured to utilize user interface statistics for deeper insights into the user's experience with the LXM. In some embodiments, the computing system may be configured to analyze the user interface statistics to determine user responses (e.g., recognizing if a furrowed brow is indicative of confusion, etc.) and identify correlations or connections between the user interface statistics and the LXM-generated content. For example, the computing system may associate a user's reduced heart rate with content they find calming.

In some embodiments, the computing system may be configured to autonomously derive feedback for the LXM system from the LXM-generated content without user involvement by collecting or determining details about the user's engagement with the LXM-generated content based on information from the sensing hub, user historical data and direct feedback and generating feedback based on the collected or determined details. The computing system may use the determined detailed or generated feedback fine-tune LXM models, to generate enhanced prompts, to update the LXM-generated content, refine user profiles for subsequent interactions, etc.

The computing system may generate enhanced LXM prompts based on the current user profile and context, generate LXM-generated content tailored to the profile and context, and present the generated content to the user. The computing system may monitor the user's interactions with the presented content, capture implicit feedback through the sensing hub (e.g., time spent on content, user facial expressions, heart rate changes), and/or capture explicit feedback from the user (e.g., likes, dislikes, comments). The computing system may analyze collected feedback to determine user sentiments (e.g., satisfactory, unsatisfactory, confusing, amusing, etc.), correlate feedback with specific sections or attributes of the LXM-generated content, use the feedback analysis to refine the user profile (e.g., to better match user preferences, etc.), and adjust LXM parameters or models to improve future content generation.

In some embodiments, the computing system may be configured to use user interface statistics to determine and differentiate profile parameters to help ensure that the LXM becomes increasingly adept at delivering content that resonates with individual users. In some embodiments, the computing system may be configured to collect and analyze user interactions and feedback to determine user preferences and behavioral patterns, identify unique parameters that set apart different segments or elements of content (e.g., based on user interactions and feedback), analyze the characteristics of content segments to determine their differentiation points concerning model parameters and profile parameters (e.g., determine whether brighter colors, slower motion, or specific musical choices have influenced user engagement, etc.), use the user interface statistics to generate descriptive feedback prompts that provide a clear understanding of user preferences (e.g., "The user shows a preference for classical music in the backdrop of this video segment.", etc.), use the feedback from user interface statistics to rank or score different content segments, analyze the ranking or scoring to determine how segments vary concerning model and profile parameters, update the user profile based on these insights, modify the LXM parameters based on user feedback and user interface statistics, adjust elements such as temperature, top-k settings, use of draft models, or level of randomness adjustment based on observed user interactions, and integrate content differentiation factors (e.g., color brightness, motion speed, animation usage, music type, etc.) into the LXM's understanding to tailor future content generation. The computing system may merge user interface statistics with content differentiation parameters and integrate them into the LXM.

For example, in response to determining that the user frequently engages more with shorter video content, the computing system may infer a preference for concise visual storytelling and adjust the user profile to favor shorter video segments. The computing system may send feedback to the LXM to prioritize slow-motion elements in subsequent content generation in response to the computing system observing that a user repeatedly rewatches slow-motion segments in a video. The computing system may send feedback to the LXM to integrate classical musical elements into future video creations in response to the computing system detecting heightened user engagement when classical music underscores a video segment.

Each user may have several user profiles corresponding to different roles or situations, such as work, personal, school, or specific usages. In some embodiments, the computing system may be configured to allow the LXM to access and employ the most relevant profile at any given time to account for users operating in different capacities at different times. In some embodiments, the computing system may be configured to retrieve available user profiles (stored on the local user end device, in a cloud-based storage solution, etc.), use input device data to identify the active user or users (e.g., via facial recognition, voice recognition, device login information, biometric data, etc.), analyze the array of sensor and input data to ascertain the user's current context (e.g., Location: Is the user at home, in the office, or in a public place?; Activity: Is the user currently driving, jogging, resting, or engaged in some other activity?; Surroundings: Is the user alone, in a professional meeting, with family, or with friends?; Device Used: Is the user accessing from a smartphone, desktop, smart TV, or another device?, etc.), select the most appropriate profile or profiles based on the identified active user and determined context to help ensure that the LXM system generates its responses or generated content to align with the user's current situation or needs, and incorporate the selected profile parameters into the LXM system to influence and guide content generation or system responses.

For example, the computing system may identify Jane Doe as an active user by using data collected from the camera to perform face recognition analysis operations. In addition, the computing system may determine that Jane is at home, possibly in her living room, and the ambient noise suggests a casual setting, indicating that she may be with family or friends. In response, the computing system may select Jane's "Personal" or "Friends" profile rather than her "Work" or "School" profile. Accordingly, the system may use this selected profile to guide any LXM-generated content generation or system interactions to help ensure that the LXM responses are tailored to Jane's current setting and needs.

In some embodiments, the computing system may include a responsive profile management system configured to monitor and manage the continual evolution of user preferences.

In some embodiments, the computing system may be configured to dynamically update and modify user profiles based on both LXM system usage and external data. In some embodiments, the computing system may be configured to provide users with the capability to directly configure and update their stored profiles, such as by explicitly setting preferences, changing existing settings, adding new criteria, etc. In some embodiments, the computing system may be configured to collate data from external non-LXM sources (e.g., emails, documents, web browsing activity, digital interactions, etc.) to detect and evaluate evolving user preferences and behavior. In some embodiments, the computing system may be configured to analyze how users interact with the LXM system. For example, the computing system may track patterns such as the type of requests made, the frequency of interactions, feedback on generated content and other user interface indicators. The computing system may integrate insights from direct configurations, external data, and LXM system feedback to update the stored profiles dynamically and store the updated profiles to help ensure that the LXM system may readily access and employ the latest user preferences for subsequent interactions.

For example, the computing system may adjust the "Work" profile to produce briefer content in response to determining that a user consistently truncates longer responses or asks for summaries while in a work setting. The computing system may modify the "Personal" profile to offer more comprehensive responses in response to determining that the user often requests elaborations or details during personal use. The computing system may automatically prioritize short and concise responses that consider the user having divided attention in response to determining based on sensor data that the user is in motion (e.g., walking, jogging, etc.). The computing system may automatically prioritize videos with expressive hand movements or emotive characters in future interactions in response to determining that the user frequently engages or reacts positively to videos with expressive hand movements or emotive characters. In response to determining that the user consistently appreciates content with certain backdrops, locales, or scenery, the computing system may send feedback to the LXM to incorporate those preferences in subsequent content generations.

The computing system may also allow the user to manually adjust one or more of their profiles. For example, the system may allow the user to manually adjust their "Work" profile to prioritize bullet-point summaries over lengthy paragraphs, set a preference for videos with calm, neutral backdrops for professional contexts, set a preference for vibrant, animated backgrounds for personal use, etc.

In some embodiments, the computing system may be configured to dynamically determine and continuously adjust the context information based on real-time data. For example, the computing system may be configured to dynamically determine (but not limited to) location-based context, people-based context, motion-based context, urgency level, I/O devices being used, emotional state of the user, etc.

Examples of location-based context may include (but is not limited to) home (e.g., relaxed, leisurely setting, etc.), office (e.g., professional, task-oriented setting, etc.), public (e.g., open, potentially distracting environment, etc.), social (e.g., surrounded by friends or acquaintances, etc.), and/or the like.

Examples of people-based context may include (but is not limited to) group access (e.g., multiple users are interacting or are present, etc.), single person access (e.g., sole user interaction, etc.), and/or the like.

Examples of motion-based context may include (but is not limited to) stationary (e.g., user is not in motion, etc.), moving (e.g., determined based on motion type, such as walking, running, driving, etc.), and/or the like.

Examples of urgency level may include (but is not limited to) offline/background activity (e.g., non-time-sensitive actions, immediacy is not paramount, etc.), online/real-time usage (e.g., time-sensitive actions requiring prompt responses, etc.), and/or the like.

Examples of I/O devices being used may include (but is not limited to) mobile/handheld (e.g., smartphones, tablets, wearables, etc.), stationary (e.g., desktops, laptops, smart TVs, etc.), and/or the like.

Examples of emotional state of the user may include (but is not limited to) positive emotions (e.g., happy, amused, etc.), neutral (e.g., indifferent, focused, etc.), negative emotions (e.g., confused, stressed, etc.), and/or the like.

For example, the computing system may determine that the user is currently engaged in physical activity in response to detecting rapid motion patterns consistent with jogging or running based on a result of analyzing inputs from the inertial measurement unit (IMU) and Global Positioning System (GPS) receiver. The computing system may prioritize concise audible outputs that the user may quickly absorb without needing to stop or slow down in response to determining that the user is currently engaged in physical activity. As another example, the computing system may cause the LXM system to prioritize content that is suitable for group consumption or interaction in response to determining that the user is in a meeting or gathering based on camera inputs showing multiple faces or microphone inputs indicating multiple voices. As another example, the computing system may determine that the user is interacting with friends in response to detecting laughter or multiple familiar voices. In response, the computing system may cause the LXM system to generate content that is more casual, entertaining, or may be shared among the group. As yet another example, the computing system may cause the LXM system to prioritize speed over depth in response to determining that the user often requests quick drafts of content. The computing system may cause the LXM system to generate thorough and refined in response to determining that the user generally seeks comprehensive answers or detailed content.

In some embodiments, the computing system may be configured to evaluate and update the LXM-generated content based on the user context and user profile information.

The computing device may be configured to generate a contextually modified prompt based on the user content data (LXM user content), user profile data (LXM user profile) and the user's initial prompt. For example, the computing device may extract or retrieve the relevant information (e.g., user content from LXM user content data, user profile information from LXM user profile data., etc.), perform contextual analysis operations, perform profile analysis operations, and prompt conditioning operations.

The contextual analysis operations may include determining the location (e.g., office, home, public place, etc.), determining the type of gathering (e.g., business meeting, casual hangout, etc.), and identifying any specific attributes related to the setting (e.g., professional, friendly, etc.). The profile analysis operations may include determining the relevant profiles and for each relevant profile extracting key attributes (e.g., profession, likes, preferences, etc.), determining whether any specific requirements or constraints are present (e.g., in line with company policies), and identifying unique characteristics (e.g., liking for a particular type of content or imagery). The prompt conditioning operations may include refining the user's initial prompt based on the contextual information, further refining the prompt based on profile-specific requirements or preferences, and updating the prompt to ensure that the modified prompt aligns with the attributes identified during the context and profile analyses operations. In some embodiments, the computing system may send the contextually modified prompt to the LXM system. In some embodiments, the computing system may present the contextually modified prompt to the user, allow the user to review and approve or make adjustments to the contextually modified prompt, and send the reviewed, approved and/or user-adjusted prompt to the LXM system for content generation.

As an example, the computing device may extract or retrieve relevant information that indicates User Content: N/A; User Profile: Marketing professional at Company X, a pioneer in wireless communication; and Initial Prompt: "Generate a video for 5G use". The contextual analysis operations may indicate Location: Office; Gathering: Business meeting with colleagues and a customer; Attributes: Professional and friendly environment, availability of a large screen for video display. The profile analysis operations may indicate User Profile: Marketing professional, prefers content with happy, satisfied people who enjoy technology, in line with company's policies; and Customer Profile: 47-year-old CEO, PhD in electrical engineering, soccer enthusiast, prefers short content, enjoys scenery from small European towns. The prompt conditioning operations may start with the prompt "Generate a video for 5G use", layer the prompt with context "Generate a short video for 5G use suitable for a business meeting presentation on a large screen" and integrate profiles "Generate a short video for 5G use in a small factory in Europe making soccer equipment, showcasing happy and satisfied people enjoying technology, and ensuring it aligns with Company X's policies." The user approval operations may include displaying "Generate a short video for 5G use in a small factory in Europe making soccer equipment, showcasing happy and satisfied people enjoying technology, and ensuring it aligns with Company X's policies" and allowing the user to approve or request tweaks. The content generation operation may include sending the refined prompt to the LXM model for content generation (e.g., upon user approval, etc.).

In some embodiments, the computing system may be configured to evaluate and weigh input parameters against a repository of refined or fine-tuned models, and intelligently select the most appropriate model for deployment based on evaluating the user's context (location, motion, urgency level, and I/O device type), profile, and prompt.

In some embodiments, the computing system may be configured to retrieve the user content data, user profile data, and the user's initial prompt (e.g., "Generate a video for 5G use"). The computing system may analyze the user's prompt to identify key attributes that dictate content generation needs, communicate with a fine-tuned model repository, cross-referencing user data with available models, and select one or more Level of randomness adjustment LLMs or fine-tuned models based on the contextual parameters such as location (public, office, home, social), motion (stationary, moving), urgency (offline/background, online/real-time), and I/O device (mobile/handheld, stationary).

In some embodiments, the computing system may be configured to evaluate and compare input parameters with a collection of refined or fine-tuned models. In some embodiments, the system may select an appropriate model for utilization by evaluating the user's context, profile, and initial prompt. In some embodiments, the computing system may access user content data, profile details, and the user's starting prompt, such as "Generate a video for 5G use", evaluate the user's prompt to determine important attributes that guide content generation requirements, communicate with a refined model repository, compare user data with available models, and select one or more refined or fine-tuned models depending on contextual parameters such as location, motion, urgency, and I/O device.

In some embodiments, the computing system may be configured to incorporate specific situational alterations to improve the LXM-generated content. For example, for example the computing device may emphasize safety by selecting shorter video or limiting the content to audio files to in response to detecting user movement that indicates that the user is driving, moderate the video resolution to hasten content generation without reducing the content's quality in response to determining that the user is employing a handheld device and seeks content promptly for entertainment purposes, present the generated content in slow motion in response to determining that the user detecting user movement that indicates that the user is jogging, etc. The ability to discern context allows the system to identify potentially risky situations. For example, detecting a user driving may lead the computing system to focus on safety, producing a void video or transitioning to an audio mode, mitigating potential distractions. The computing system may make adjustments for prompt efficiency by determining the type of device the user is utilizing and the urgency level. A user employing a handheld device may benefit from succinct content that loads rapidly, and generating content at a reduced resolution may facilitate quicker processing and loading durations.

In some embodiments, the computing system may be configured to improve LXM system performance by extracting contextual parameters from user content, user profile, and a user prompt. For example, the computing device may determine the motion state (e.g., stationary, jogging, etc.) based on location data obtained from the user content, identify the urgency level (e.g., offline/background activity, online/real-time engagement) based on information obtained from the user profile, determine the specific type of I/O device (e.g., mobile, handheld, stationary, etc.) based on the user profile, etc. In some embodiments, the computing system may also analyze the user prompt to identify important attributes and intrinsic requirements.

In some embodiments, the computing system may select a refined or fine-tuned model based on the extracted contextual parameters, identified important attributes, intrinsic requirements, etc. In some embodiments, this selection may be paired with suitable adapters from a catalog that corresponds closely with the determined parameters.

In some embodiments, the computing system may be configured to facilitate the creation of context-aware content through an advanced LXM system.

In some embodiments, the computing system may be configured to employ a variety of specialized algorithms or methods to extract meaningful insights from the categorized data. These algorithms/methods may include person/face detection, object recognition, segmentation, motion detection, gaze tracking, individual identification, role classification, activity detection, emotional assessment, and audio-visual scene categorization. In some embodiments, the computing system may be configured to construct a detailed contextual and user profile incorporating elements such as user roles, emotions, ongoing activities, clothing styles, and levels of interest based on a result of these algorithms/methods.

In some embodiments, the computing system may be configured to formulate specific text-based requests for LXMs using the amassed and processed information. For example, when a user with a distinct profile, termed as "Profile_A", requests content (such as a video related to 5G) from the LXM system, the computing system may consider the user's unique profile, the intended recipient's profile ("Profile_B"), and the prevailing context (such as user emotions, activities, and locations such as the San Diego Convention Center). In some embodiments, the computing system may be configured to fine-tune the LXM request based on this comprehensive information, ensuring the output is both personalized and pertinent to the context.

In some embodiments, the computing system may be configured to communicate with a refined or fine-tuned model repository to choose suitable model adaptations. Selection criteria may encompass aspects such as location, motion patterns, urgency levels, I/O device types, usage patterns, content categories, and other context-driven parameters. In some embodiments, the computing system may be configured to ensure that the most fitting model is employed, tailored for the current user and situation.

Various embodiments may be implemented on a number of single-processor and multiprocessor computer systems, including a system-on-chip (SOC) or system in a package (SIP). FIG. 1A illustrates an example computing system or SIP 100 architecture that may be used in user end devices implementing the various embodiments.

With reference to FIG. 1A, the illustrated example SIP 100 includes two SOCs 102, 104, a clock 106, a voltage regulator 108, and a wireless transceiver 166. The first and second SOC 102, 104 may communicate via interconnection bus 150. Various processors 110, 112, 114, 116, 118, 121, 122, may be interconnected to each other and to one or more memory elements 120, system components and resources 124, and a thermal management unit 132 via an interconnection bus 126, which may include advanced interconnects such as high-performance networks-on-chip (NOCs). Similarly, the processor 152 may be interconnected to the power management unit 154, the mmWave transceivers 156, memory 158, and various additional processors 160 via the interconnection bus 164. These interconnection buses 126, 150, 164 may include an array of reconfigurable logic gates and/or implement a bus architecture (e.g., CoreConnect, AMBA, etc.). Communications may be provided by advanced interconnects, such as NOCs.

In various embodiments, any, or all of the processors 110, 112, 114, 116, 121, 122, in the system may operate as the SoC's main processor, central processing unit (CPU), microprocessor unit (MPU), arithmetic logic unit (ALU), etc. One or more of the coprocessors 118 may operate as the CPU.

In some embodiments, the first SOC 102 may operate as the central processing unit (CPU) of the mobile computing device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high-frequency short wavelength (e.g., 28 GHz mmWave spectrum, etc.) communications.

The first SOC 102 may include a digital signal processor (DSP) 110, a modem processor 112, a graphics processor 114, an application processor 116, one or more coprocessors 118 (e.g., vector co-processor, CPUCP, etc.) connected to one or more of the processors, memory 120, deep processing unit (DPU) 121, artificial intelligence processor 122, system components and resources 124, an interconnection bus 126, one or more temperature sensors 130, a thermal management unit 132, and a thermal power envelope (TPE) component 134. The second SOC 104 may include a 5G modem processor 152, a power management unit 154, an interconnection bus 164, a plurality of mmWave transceivers 156, memory 158, and various additional processors 160, such as an applications processor, packet processor, etc.

Each processor 110, 112, 114, 116, 118, 121, 122, 121, 122, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 11). In addition, any, or all of the processors 110, 112, 114, 116, 118, 121, 122, 121, 122, 152, 160 may be included as part of a processor cluster architecture (e.g., a synchronous processor cluster architecture, an asynchronous or heterogeneous processor cluster architecture, etc.).

Any or all of the processors 110, 112, 114, 116, 118, 121, 122, 121, 122, 152, 160 may operate as the CPU of the mobile computing device. In addition, any, or all of the processors 110, 112, 114, 116, 118, 121, 122, 121, 122, 152, 160 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

The first and second SOC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, Access ports, timers, and other similar components used to support the processors and software clients running on a computing device. The system components and resources 124 may also include circuitry to interface with peripheral devices, such as cameras, electronic displays, wireless communication devices, external memory chips, etc.

The first and/or second SOCs 102, 104 may further include an input/output module (not illustrated) for communicating with resources external to the SOC, such as a clock 106, a voltage regulator 108, and a wireless transceiver 166 (e.g., cellular wireless transceiver, Bluetooth transceiver, etc.). Resources external to the SOC (e.g., clock 106, voltage regulator 108, wireless transceiver 166) may be shared by two or more of the internal SOC processors/cores.

In addition to the example SIP 100 discussed above, various embodiments may be implemented in various computing systems, including a single processor, multiple processors, multicore processors, or any combination thereof.

Figure 1B:
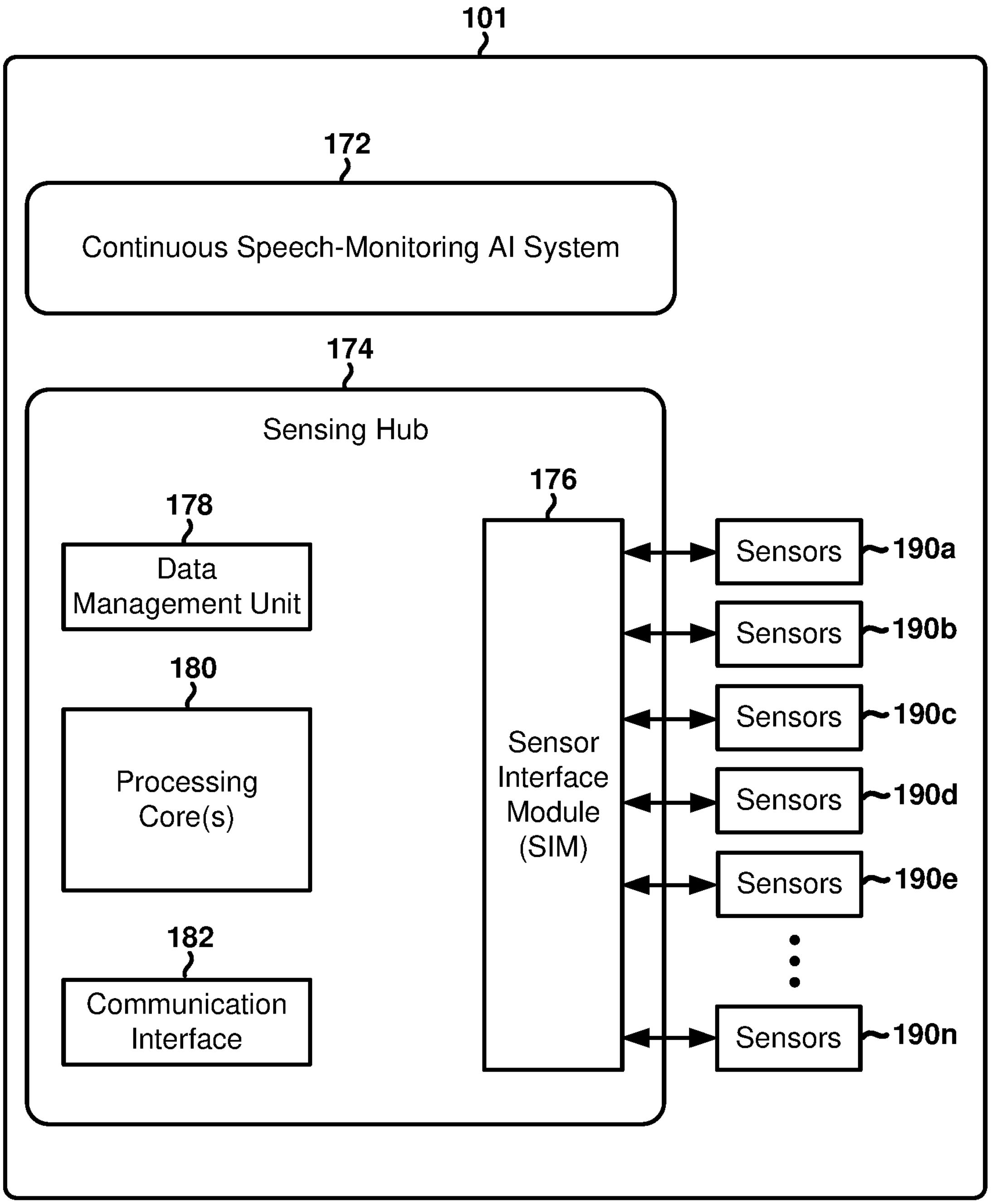
FIG. 1B is a component block diagram illustrating an example computing system architecture that may be used in user end devices implementing the various embodiments.

FIG. 1B illustrates an example computing system 101 architecture that may be used in user end devices implementing the various embodiments. With reference to FIG. 1B, the computing system 101 may include a continuous speech-monitoring AI system 172 that is configured to continuously or perpetually listen to and analyze human speech and/or other sensor data, convert spoken language into text through a process known as speech recognition, and identify user queries. Unlike conventional voice-activated systems that await specific prompts to initiate an interaction, the continuous speech-monitoring AI system 172 may maintain an ongoing auditory observation of the users (e.g., they are always listening and analyzing) to better understand the user's context, emotional tone, and immediate needs. The continuous speech-monitoring AI system 172 may also implement and/or use advanced natural language processing (NLP) algorithms to interpret spoken words, phrases, or sentences for context and user profile information.

The computing system 101 may also include a sensing hub 174. The sensing hub 174 may be a specialized component on the computing system 101 that is dedicated to gathering sensor data (e.g., multi-sensory data) and/or configured to compile or collate various types of sensory inputs such as auditory signals from a microphone, visual data from a camera, or biometric indicators from wearable devices. The sensing hub 174 may be configured to interface with a multitude of sensors 190*a*-190*n* through a dedicated Sensor Interface Module (SIM) 176. Examples of such sensors 190*a*-190*n* include accelerometers for linear motion detection, gyroscopes for assessing angular velocity and positioning, temperature sensors for ambient conditions, humidity detectors, barometers, ambient light gauges, proximity detectors, orientation trackers, infrared sensors, physical activity monitors, distance measurers, geolocation trackers, heart activity monitors, environmental detectors, biometric identifiers (such as those for fingerprints, retinal scans, and facial recognition), blood pressure and glucose monitors, alcohol detectors, and specialized sensors such as those for acidity assessment, thermal imaging, spatial mapping, deflection gauging, and load sensing, etc.

The sensing hub 174 may also include a data management unit 178 for data storage and retrieval, one or more processing cores 180 for computational tasks, and a communication interface 182 for coordinating with the main processor of the computing system. The sensing hub 174 may be configured to perform real-time data processing, use data from different sensors to derive context or develop a contextual understanding of the device's surroundings, user's condition, etc., generate composite information based on the multi-sensor data and contextual information, use the generated composite information to generate a user profile or a user context, generate or update a prompt, generate or update LXM output, adjust device settings, trigger specific actions on the computing system, or perform other similar operations. The derived context may include actionable information formulated through the analysis of multi-sensor data, which may directly influence functionalities or behaviors of the computing system and associated applications. For example, derived context could indicate physical activities such as running, triggering a tracking feature in a fitness application. Similarly, the derived context may indicate indoor or outdoor environments, vehicle usage, sleep states, meeting scenarios, emergency situations, and user moods, etc., each leading to specific, appropriate actions or settings adjustments.

The sensing hub 174 may continually capture inputs, data, and information from diverse sensors or modalities that offer a broad spectrum of sensor data. In some embodiments, the computing system 101 may be configured to use the information collected by the sensing hub 174 in conjunction with information captured by any of the sensors and input/output devices accessible to the user to structure the LXM prompts and content. In some embodiments, the computing system 101 may be configured to analyze and combine data from these diverse sources to obtain comprehensive insights into the user's context when interacting with the LXM system.

The data from the sensors may be real-time (or near real-time) data and/or historical sensed/collected data.

Figure 2A:
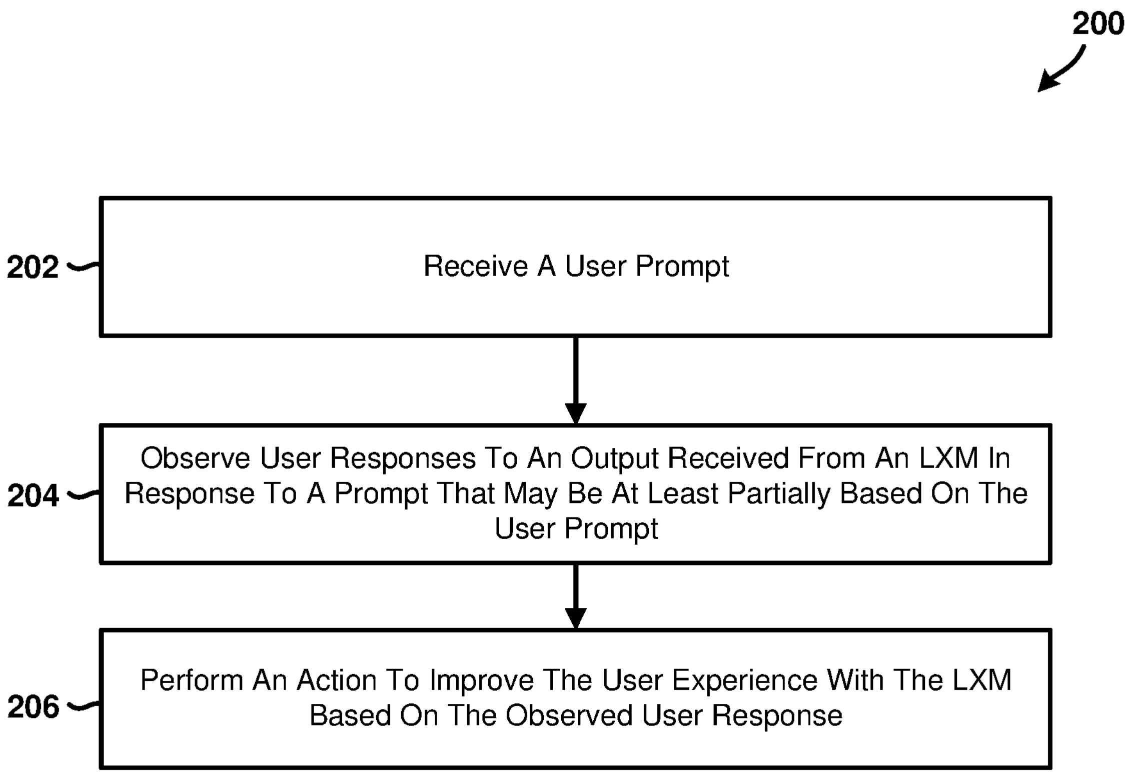
FIGS. 2A-2E are process flow diagrams illustrating methods of improving the user experience with LXMs in accordance with some embodiments.
Figure 2B:
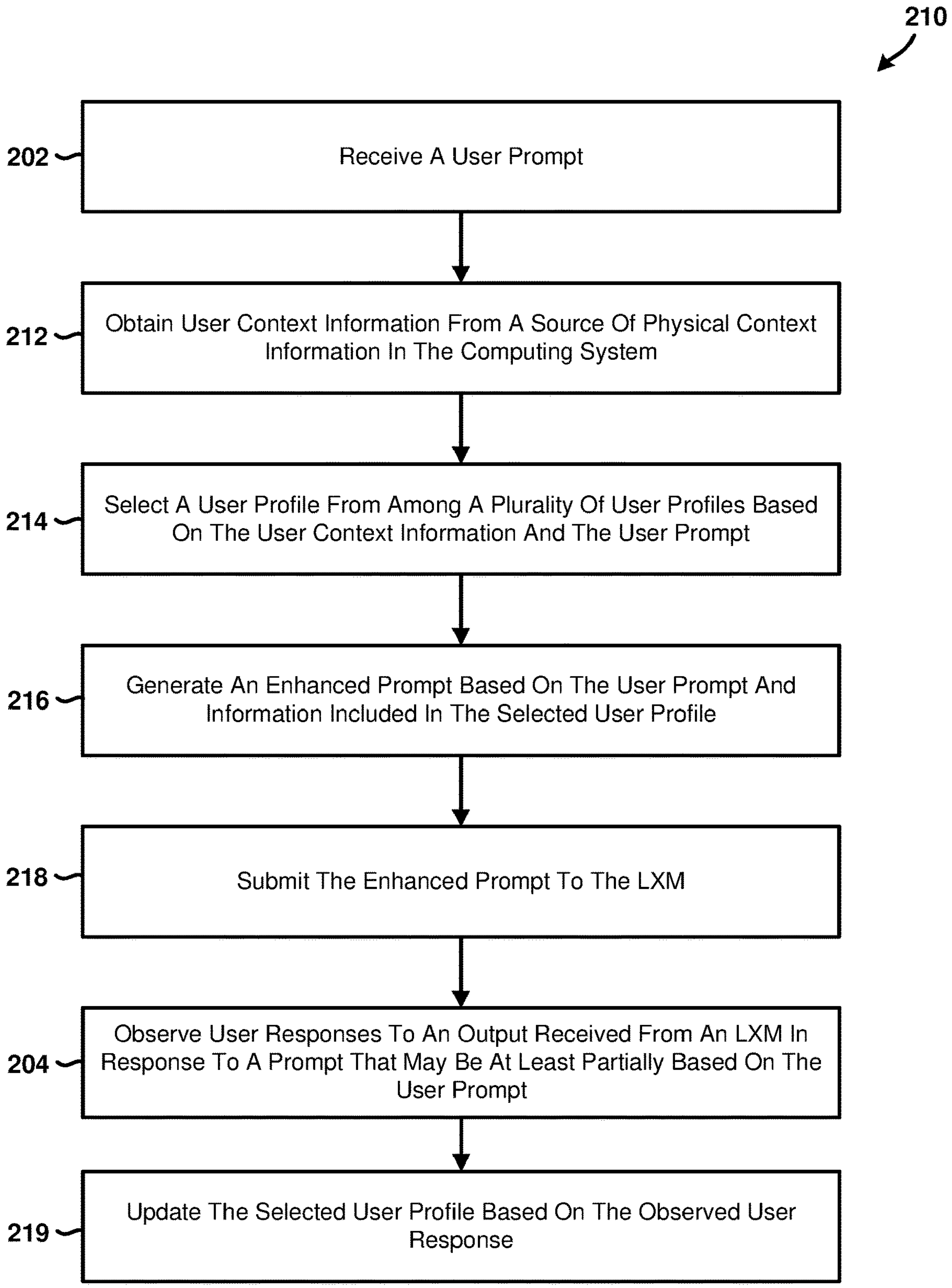
Figure 2C:
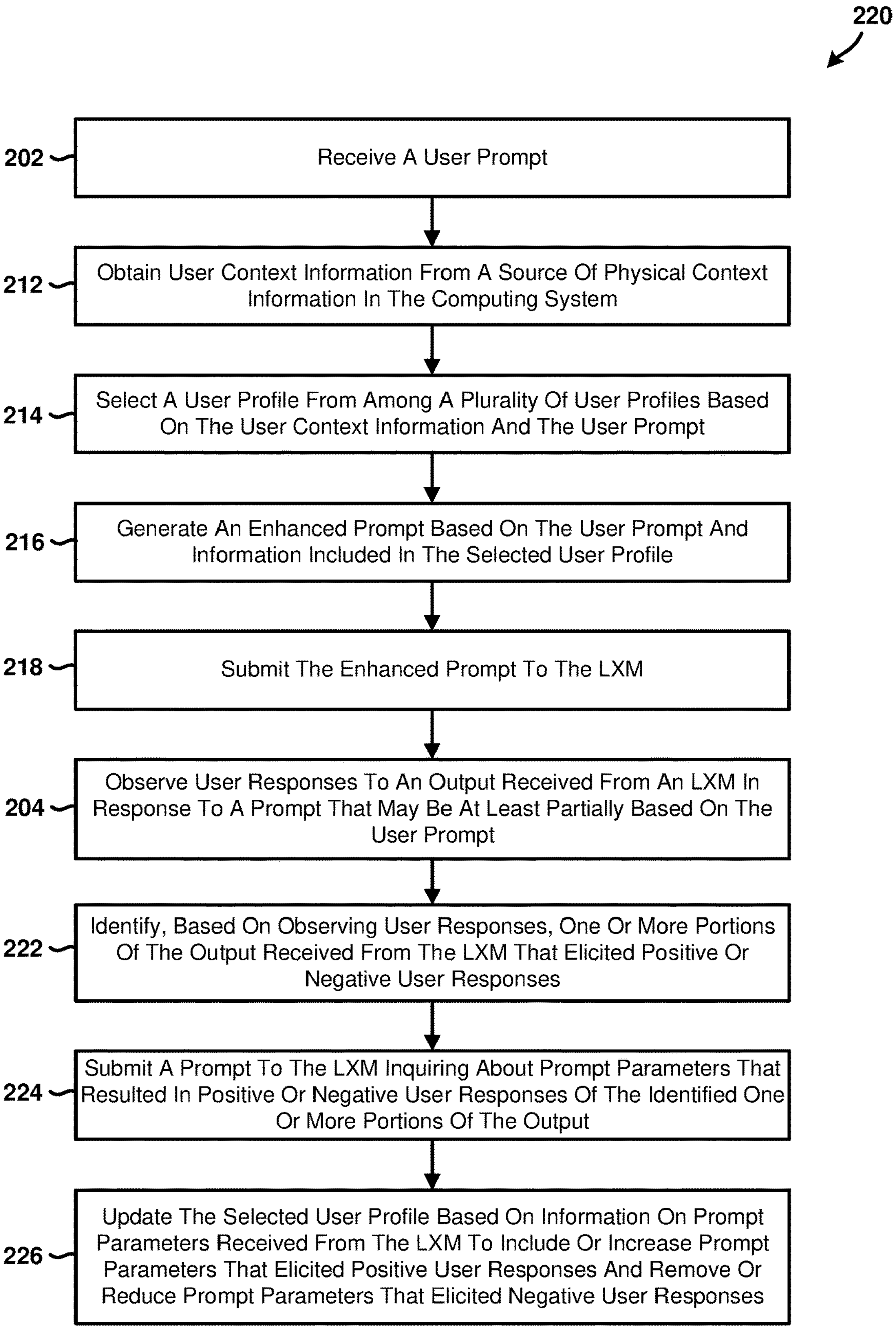
Figure 2D:
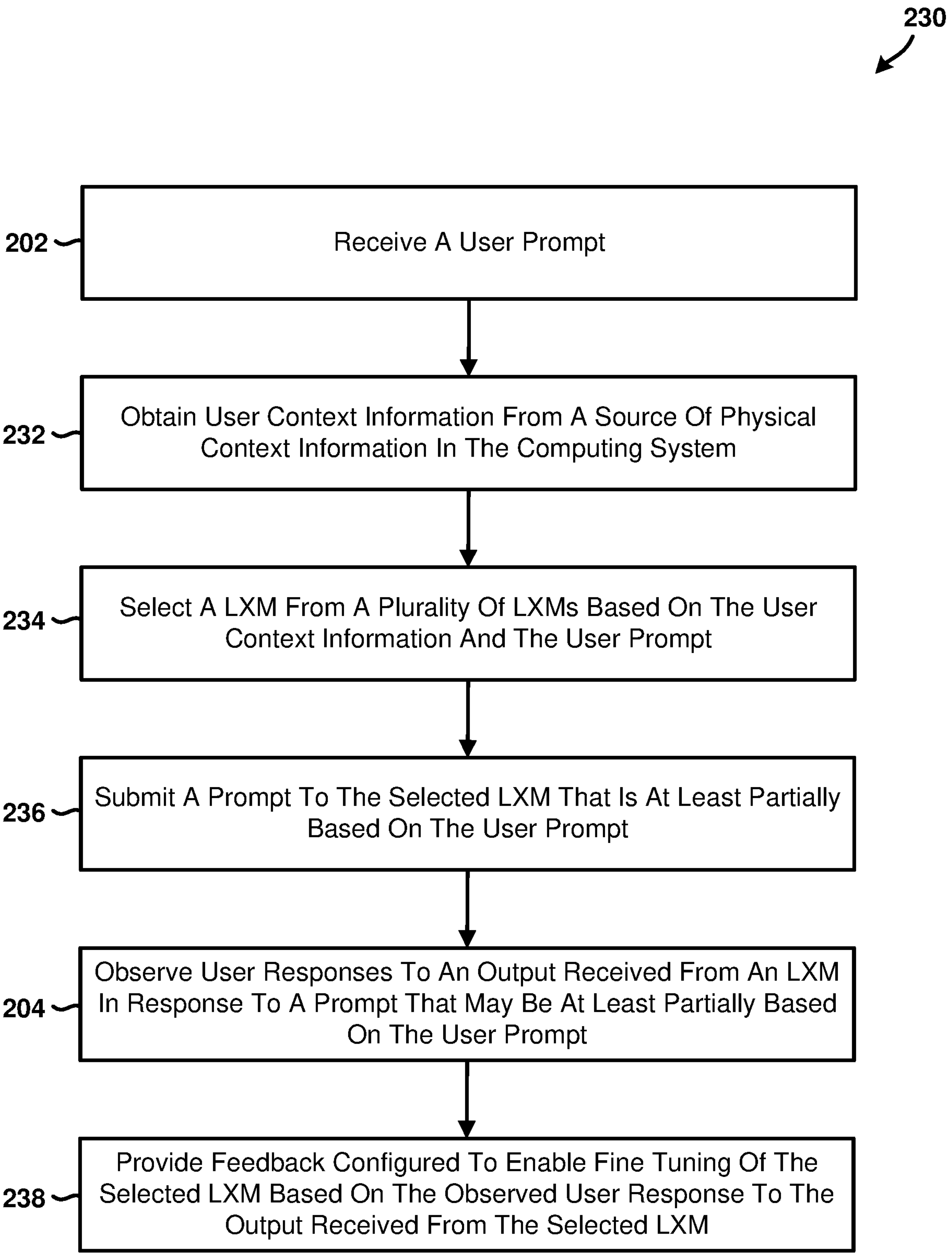
Figure 2E:
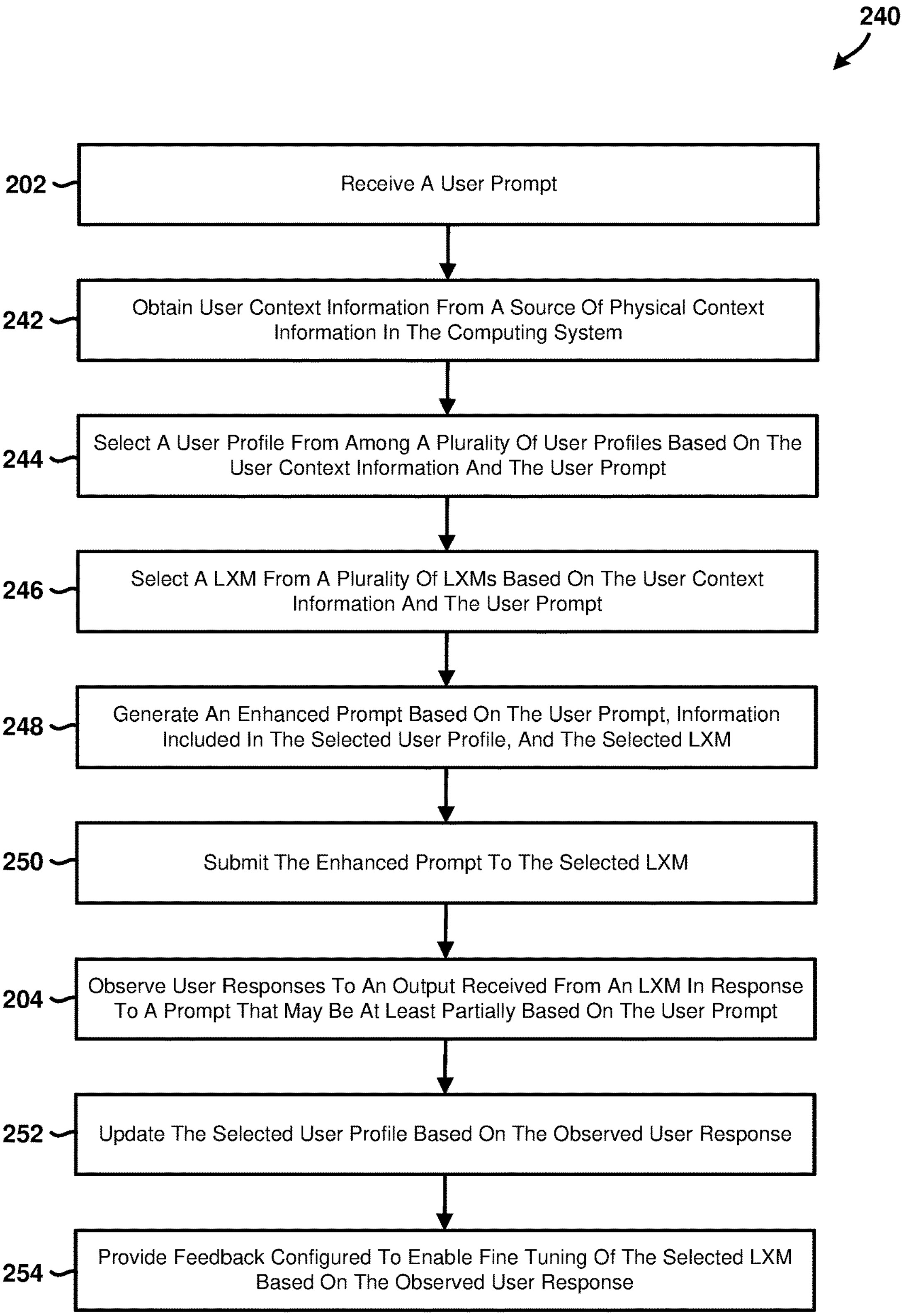

FIGS. 2A-2E are process flow diagrams illustrating methods 200, 210, 220, 230, 240 of improving the efficacy of and user experience with LXMs in accordance with some embodiments. With reference to FIGS. 1-2E, the methods 200, 210, 220, 230, 240 may be performed in a computing device by at least one processor of a processing system encompassing one or more processors (e.g., 110, 112, 114, 116, 118, 121, 122, 121, 122, 152, 160, 180, etc.), components or subsystems discussed in this application. Means for performing the functions of the operations in the methods 200, 210, 220, 230, 240 may include at least one processor including one or more of processors 110, 112, 114, 116, 118, 121, 122, 121, 122, 152, 160, 180, and other components described herein. Further, one or more processors of at least one processor may be configured with software or firmware to perform some or all of the operations of the methods 200, 210, 220, 230, 240. In order to encompass the alternative configurations enabled in various embodiments, the hardware implementing any or all of the methods 200, 210, 220, 230, 240 is referred to herein as "at least one processor."

For the sake of clarity and ease of presentation, methods 200, 210, 220, 230, 240 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

With reference to FIGS. 1A-2A, in block 202, the at least one processor may receive a user prompt. For example, the at least one processor may capture a textual or vocal query input by the user via an interface, such as a graphical user interface (GUI) or a voice-activated command system. The at least one processor may convert the captured data into a format suitable for further processing. The input data may originate from diverse sources or input-output (IO) devices, including but not limited to keyboards, touchscreens, microphones, or gesture-based input devices. In some embodiments, the at least one processor may preprocess the prompt to eliminate any redundancies or to enhance its clarity, ensuring that subsequent stages of processing are more efficient and accurate.

In block 204, the at least one processor may observe user responses to an output received from an LXM in response to a prompt that may be at least partially based on the user prompt. For example, the at least one processor may analyze the duration between the LXM's output and the user's subsequent input to gauge user comprehension or satisfaction. If the user quickly responds with a follow-up question, it might indicate that the initial output was not comprehensive enough. In addition, the system may monitor direct feedback inputs, such as pressing thumbs-up or thumbs-down icons, to ascertain user satisfaction. The system may also record patterns of user corrections or modifications to the LXM's output to identify areas for future LXM refinement. Further, if integrated with audio or visual capabilities, the at least one processor may evaluate non-verbal cues, such as voice intonations or facial expressions, to infer user reactions to the LXM's outputs.

In block 206, the at least one processor may perform an action to improve the user experience with the LXM based on the observed user response. For example, the at least one processor may analyze the user's feedback to determine areas in which the LXM output is deficient or misaligned with the user's expectations. If a pattern of similar feedback emerges from multiple users or repeatedly from a single user, the at least one processor may adjust the LXM's parameters to account for those patterns. For example, if users frequently ask for clarifications after receiving certain types of responses, the at least one processor may refine the enhanced prompt or the LXM to provide more detailed explanations for those topics in subsequent interactions. If a user appears dissatisfied with the response speed, the at least one processor may adjust the prompts to improve the response time of the LXM. For users who consistently give positive feedback on specific response formats, the at least one processor could refine the enhanced prompt or the LXM to prioritize such formats in future interactions.

With reference to FIGS. 1A-2B, the at least one processor may receive an initial user prompt as described for the like numbered block on the method 200 as described.

In block 212, the at least one processor may obtain user context information from a source of physical context information in the computing system. For example, the at least one processor may interface with the GPS module to ascertain the user's current geographical location, which may be used to tailor services or responses relevant to the user's vicinity. In addition, the at least one processor may access the device's accelerometer or gyroscope to determine whether the user is stationary or in motion, analyze data from the ambient light sensor to determine surrounding lighting conditions, etc. In some embodiments, the at least one processor may integrate and analyze data from multiple sources, such microphones, cameras, and connectivity status, to generate a more comprehensive understanding of the user's physical context.

In block 214, the at least one processor may select a user profile from among a plurality of user profiles based on the user context information and the user prompt. For example, the at least one processor may analyze the GPS data to determine the user's current location and time of day. If the user is determined to be at an office location during regular business hours and the prompt inquiries about "upcoming meetings," the at least one processor could select a "Professional" or "Work" profile. On the other hand, if the same user is identified to be at a recreational park on a weekend and the prompt is about "nearest ice cream parlors," the 'Leisure' or 'Personal' profile might be selected. The at least one processor continually evaluates the real-time context and the nature of the prompt to dynamically choose the most appropriate profile.

In block 216, the at least one processor may generate an enhanced prompt based on the user prompt and information included in the selected user profile. For example, the at least one processor may analyze the initial user prompt and cross-reference it with attributes and preferences stored in the selected user profile. If a user provides a prompt asking for "a movie recommendation," and their profile indicates a preference for action films and a recent viewing of time-travel themed movies, the at least one processor may refine the initial prompt to "recommend a time-travel action movie."

In block 218, the at least one processor may submit the enhanced prompt to the LXM. For example, the at least one processor may use a communication interface to forward the enhanced prompt that includes a refined query to the LXM.

The enhanced prompt may facilitate a more tailored and precise output from the LXM that aligns well with the user's needs and preferences. For example, if the original user prompt was "suggest a book," and the user's profile indicates an affinity for fiction, museums, and U.S. history, the enhanced prompt "suggest a historical fiction book" could be submitted to the LXM for a response more attuned to the user's specific interests.

In block 204 the at least one processor may observe user responses to an output received from the LXM in response to the prompt as described for the like numbered block of the method 200 as described.

In block 219, the at least one processor may update the selected user profile based on the observed user response. For example, the at least one processor may analyze the user's interaction patterns, such as content preference or engagement duration, to refine the profile's parameters. The at least one processor may adjust the user profile to prioritize visual data in future interactions if the user often interacts with visual content more than textual content. Alternatively, based on explicit feedback, such as ratings or comments, the at least one processor could incorporate these inputs to enhance the accuracy of the profile. In addition, by evaluating the frequency of certain queries, the at least one processor may determine recurring interests and integrate these insights into the profile for predictive personalization. Such continuous profile refinement may help ensure that subsequent interactions are tailored more closely to the user's evolving needs and preferences.

With reference to FIGS. 1A-2C, the at least one processor may receive an initial user prompt as described for the like numbered block on the method 200 as described. In blocks 212-218, the at least one processor may perform operations of the like numbered blocks of the method 210 as described. In block 204 the at least one processor may observe user responses to an output received from the LXM in response to the prompt as described for the like numbered block of the method 200 as described.

In block 222, the at least one processor may identify, based on observing user responses, one or more portions of the output received from the LXM that elicited positive, negative, or neutral user responses. For example, if the computing system is equipped with cameras or other sensing devices, the at least one processor may use emotion recognition algorithms to observe facial expressions, gaze direction, or other non-verbal cues to gauge user reactions to specific portions of the LXM output. As another example, the at least one processor may analyze explicit user feedback, such as comments or ratings, associated with specific segments of the LXM output. If a user highlights a section of text and leaves a comment or uses a rating system, the at least one processor may identify this action and associate the feedback with the specific portion of the LXM output. As another example, if the user highlights a particular section and annotates it as "helpful," the system may mark that segment as eliciting a positive response. Conversely, if a section is tagged by users as "unclear," the system could identify it as a portion evoking a negative reaction. In addition, the at least one processor may monitor and analyze user behaviors, such as the time spent on a particular section, mouse movements, clicks, or scroll patterns. Portions that receive more attention might be considered as eliciting positive responses, while sections quickly scrolled past might be perceived as less engaging or negative. By monitoring user behavior, such as time spent on a section or mouse movements, the system might infer user interest or confusion, further refining its understanding of the user's reception of the content. Through such observations and analyses, the at least one processor may better determine the effectiveness of the LXM output and adjust to improve the user experience.

In block 224, the at least one processor may submit a prompt to an LXM inquiring about prompt parameters and/or content characteristics that resulted in positive, negative, or neutral user responses of the identified one or more portions of the output. For example, the at least one processor may analyze user feedback on a series of responses provided by the LXM. In response to identifying a response that received commendations for clarity, the system may request the LXM to detail the parameters used in formulating that particular response. Conversely, if a certain output is flagged by users as convoluted or lacking in detail, the system may interact with the LXM to determine the specific parameters that guided that response. In addition, the at least one processor may use an alternative LXM to analyze the differences in content that elicited a positive response from the user in comparison to other content that elicited a neutral or negative response. For example, when comparing two video segments that elicited contrary responses, the system may create a prompt for an LXM to analyze the videos and determine the differences in style, colors, characters, etc. In this example, the LXM may determine that the content that elicited a positive response had a specific cartoon character. The system can use this information to update the prompt and the user's profile.

Thus, in various embodiments, the at least one processor may implement two or more different approaches for querying parameters that result in varying types of user responses. These approaches include using the same LXM that initially generated the content or a different LXM entirely. If the system aims to understand the parameters set within a single LXM that affected the type of output generated—such as "temperature," "max-token," or "top-k"—it would be beneficial to use that same LXM for querying these parameters. This is because the same LXM is already configured with these parameters and can provide insight into how they influenced the generated output. On the other hand, if the objective is to compare and analyze content to understand why it elicited a particular kind of user response, then using a different LXM for querying might be beneficial. A separate LXM may offer a fresh perspective and allow for a comparative analysis of the content (e.g., rather than focusing on the model-specific parameters that guided the initial output, etc.).

In block 226, the at least one processor may update the selected user profile based on information on prompt parameters received from the LXM to include or increase prompt parameters that elicited positive user responses and remove or reduce prompt parameters that elicited negative user responses. For example, the at least one processor may evaluate feedback received from the user after each interaction with the LXM. In response to determining that a particular response was highly appreciated, the at least one processor may identify the specific prompt parameters that influenced that positive response. Conversely, for feedback indicating dissatisfaction, the at least one processor may determine the parameters that contributed to the output that caused the dissatisfaction. The at least one processor may refine the selected user profile through such continuous assessment to increase the influence of favorable parameters and diminish or exclude parameters that detract from the desired user experience. For example, if the LXM output indicates that a well-received response was shaped by parameters emphasizing clarity and simplicity, the at least one processor may adjust the user profile to prioritize these attributes in future interactions. On the other hand, if verbosity was identified as a negative factor in a response, its influence could be decreased in subsequent prompts.

With reference to FIGS. 1A-2D, in block 202 the at least one processor may receive an initial user prompt as described for the like numbered block on the method 200 as described.

In block 232, the at least one processor may obtain user context information from a source of physical context information in the computing system. For example, the at least one processor may detect and evaluate the motion sensors to determine if the user is stationary or in motion. If the user's device has a GPS or location service enabled, the at least one processor may determine whether the user is in a workplace or at a leisure spot (thus interpreting the setting attribute). By examining application usage patterns, the system may infer the usage attribute, categorizing interactions as business-oriented, entertainment-driven, or educational. Depending on the device's display capabilities, the system may fetch screen resolution data to adjust visual content to ensure that it aligns with either 4k or 1080p criteria. Similarly, by identifying the kind of device in use (e.g., a large desktop screen or a compact mobile device, etc.) the content may be formatted to fit the display type. In addition, by analyzing system alerts, calendar entries, or app notifications, the at least one processor may determine the urgency or priority of tasks, allowing the LXM to deliver time-sensitive information promptly or defer certain operations to a later, more suitable time.

In block 234, the at least one processor may select a LXM from a plurality of LXMs based on the user context information and the user prompt. The selected LXM may be stored locally on the computing system or remotely, depending on system architecture and requirements. In some embodiments, the selected LXM may be hosted on the computing system. In some embodiments, the plurality of LXMs may be adapted for different user profiles and user contexts. In some embodiments, the at least one processor may select one or more of the plurality of LXMs that are adapted for the determined location of the user, adapted for the determined activity of the user, etc.

Different LXMs might be better suited to various geographical locations, taking into consideration local languages, dialects, and cultural nuances. For example, if the user context reveals that the individual is currently in Mexico, the system might prioritize an LXM that is proficient in Spanish and understands regional idioms and references. Such geographically tuned LXMs may help provide regionally accurate and culturally sensitive outputs. Similarly, the activity or intent of the user may play a role in the LXM selection. If the system identifies through context information that the user is engaging in a fitness activity, it might choose an LXM tailored to health and exercise topics. On the other hand, if the user is recognized as being in a museum, the system may select an LXM with training in art and history. Other environmental factors could also be used for the selection of the LXM. For example, if the context indicates a noisy environment, the LXM might be chosen for its ability to provide concise and clear answers to reduce the probability of misunderstandings. Conversely, in a quiet study setting, the selected LXM may be more adept at providing detailed and comprehensive responses.

In block 236, the at least one processor may submit to the selected prompt that may be at least partially based on the user prompt. For example, the at least one processor may refine the original user query by appending specific keywords or parameters to enhance clarity and precision. The at least one processor may modify a user prompt asking a general question such as "history of pyramids," to "ancient Egyptian pyramids construction techniques" in response to determining that context suggests a focus on construction. In addition, the at least one processor may integrate known context attributes, such as the user's location or recent search history, into the prompt to make the query more relevant. If the user is detected to be near Cairo, the same query may be transformed to "history of pyramids in Giza."

In block 204 the at least one processor may observe user responses to an output received from the LXM in response to the prompt as described for the like numbered block of the method 200 as described.

In block 238, the at least one processor may provide feedback configured to enable fine-tuning of the selected LXM based on the observed user response to the output received from the selected LXM. In some embodiments, the at least one processor may fine tune the selected LXM on the computing system based on the observed user response to the output received from the selected LXM. For example, the at least one processor may track patterns in user interactions to identify frequent areas of confusion or inefficiency. As a further example, the at least one processor may determine that the current LXM response is either too vague or too technical for a general audience in response to determining that multiple users ask follow-up questions to an initial query about "network configurations." The at least one processor may also analyze implicit indicators such as the duration of user engagement with provided content. For instance, if users consistently exit or divert from a linked tutorial video within the first few seconds, it could imply that the content wasn't deemed relevant or engaging. In addition, the at least one processor may incorporate explicit feedback such as users rating the usefulness of responses or providing direct comments. For example, after a detailed explanation about "cloud computing," users might have the option to rate the clarity of the explanation on a scale from 1 to 5.

The collected feedback can then be used to adjust parameters, weights, or even training data of the LXM to enhance its performance. Over time, such iterative feedback and adjustment cycles ensure that the LXM remains adaptive and continually improves its understanding of user needs and preferences.

With reference to FIGS. 1A-2E, in block 202 the at least one processor may receive an initial user prompt as described for the like numbered block on the method 200 as described.

In block 242, the at least one processor may obtain user context information from a source of physical context information in the computing system. For example, the at least one processor may interpret data from the sensor hub or embedded sensors, such as accelerometers, to discern the user's current motion status (e.g., stationary, walking, running, etc.). In addition, by connecting to available network services, the at least one processor may determine whether the user is in a familiar environment (e.g., home, office, etc.) based on known Wi-Fi connections. The at least one processor may determine the user's geographical position and anticipate needs related to that location by using integrated location services, such as GPS or Wi-Fi triangulation. Further, the at least one processor may generate insights into potential activities or user commitments by analyzing time and stored calendar data. The at least one processor may adjust functionalities to best fit the user's current context (e.g., modify screen brightness based on ambient light readings, etc.) by assessing device usage patterns and inputs from environmental sensors.

In block 244, the at least one processor may select a user profile from among a plurality of user profiles based on the user context information and the user prompt. For example, the at least one processor may evaluate the time of day, ambient noise levels, and location data to determine whether the user is in a professional or leisurely setting. If a user asks about news updates during morning hours in a quiet environment, the system may select a profile that provides concise, business-focused news briefings. The at least one processor may activate a profile that offers comprehensive dining suggestions with ratings and reviews in response to a query about local restaurants made during evening hours in a bustling urban area.

In block 246, the at least one processor may select a LXM from a plurality of LXMs based on the user context information and the user prompt. For example, the at least one processor may evaluate the user's current environment, preferences, and the nature of their query, then cross-reference these with the capabilities of available LXMs. The at least one processor may determine the LXM that is best suited to provide an answer or generate content that is both contextually appropriate and directly addresses the user's prompt. For example, the at least one processor may select an LXM trained extensively on formal business communication in response to determining based on the user context that the user is in a corporate environment and the user prompt is about drafting a business email.

In block 248, the at least one processor may generate an enhanced prompt based on the user prompt, information included in the selected user profile, and the selected LXM. For example, the at least one processor may evaluate the breadth of a query in the initial user prompt, integrate personal preferences from the user profile, and generate the enhanced prompt to align with the strengths of the chosen LXM. For example, the at least one processor may transform a general query such as "book recommendations" to a more targeted and personalized "classic literature book recommendations for a 30-year-old."

In block 250, the at least one processor may submit the enhanced prompt to the selected LXM. That is, the at least one processor may determine the most relevant LXM based on the user's initial query, create the enhanced prompt based on the user profile and contextual information, and forward this enhanced prompt to the LXM to receive a more tailored and precise response. Submitting the enhanced prompt to the selected LXM is an integral part of ensuring that the user receives the most relevant and personalized response. The enhanced prompt may include additional context, specificity, and user preferences that were not present in the original user prompt.

In block 204 the at least one processor may observe user responses to an output received from the LXM in response to the prompt as described for the like numbered block of the method 200 as described.

In block 252, the at least one processor may update the selected user profile based on the observed user response. For example, the at least one processor may analyze the duration a user spends on certain content, the frequency of questions about a particular topic, or any explicit feedback provided. Based on this analysis, the at least one processor may update the user profile (e.g., to include interest categories, to update their preferred content format, etc.) to help ensure that subsequent interactions become increasingly tailored to the user's evolving requirements and interests. For example, a user in the field of molecular biology who frequently asks about specific proteins might no longer need to specify "protein" in future queries about "CRISPR" or "hemoglobin" as the system already understands their professional background.

In block 254, the at least one processor may provide feedback configured to enable fine tuning of the selected LXM based on the observed user response. For example, the at least one processor may analyze patterns in user prompts and corrections to identify consistent deviations from the model's initial response. The at least one processor may identify areas in which the LXM often provides overly technical explanations to a user who seeks basic information. The at least one processor may use this feedback to adjust the model's parameters so that it offers simpler explanations in the future when similar queries arise from that user.

Figure 3:
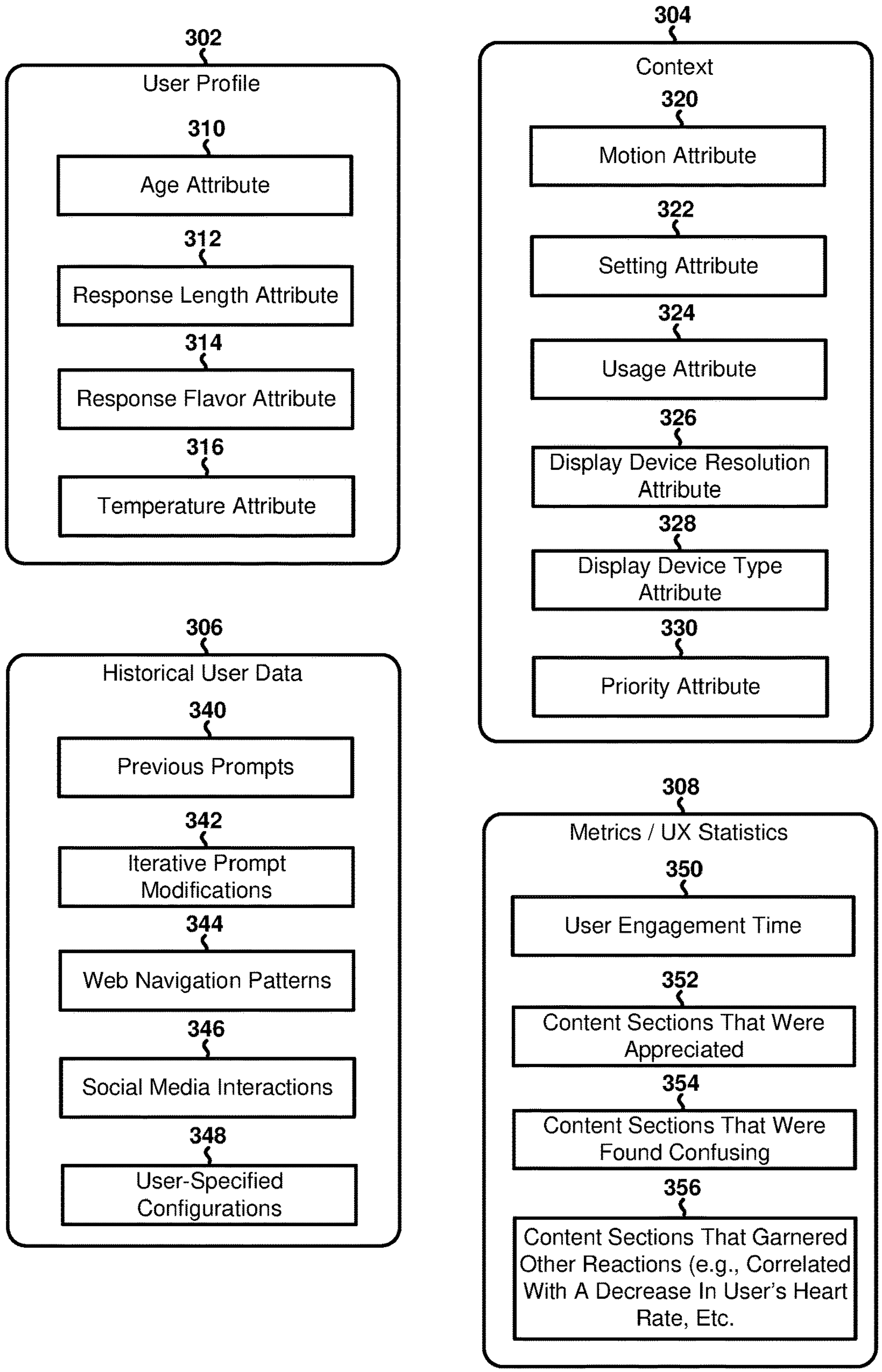
FIG. 3 is a component block diagram illustrating example information structures that may be used in user end devices implementing the various embodiments.

FIG. 3 illustrates various information structures that could be generated, updated, and used by a computing device configured in accordance with some embodiments. With reference to FIGS. 1A-3, a computing system may be configured to perform context-based and/or profile-based automation operations, which may include collecting, generating, and/or using user profile 302 information, context 304 information, historical user data 306, and/or metrics (or user interface statistics) 308 to generate enhanced prompts, fine tune models, and/or otherwise improve the user experience.

In some embodiments, the computing system may be configured to generate context 304 information that may be used to evaluate the context in which the user interacts with the LXM. For example, the context 304 information may include a motion attribute 320, a setting attribute 322, a usage attribute 324, a display device resolution attribute 326, a display device type attribute 328, and a priority attribute 330. The computing system may use the motion attribute 320 to differentiate between a mobile or stationary user, the setting attribute 322 to determine whether the user is in a professional or personal environment, the usage attribute 324 to determine whether the user prompt is for business, entertainment, education, etc. The display device resolution attribute 326 may be used for adjusting for visual clarity whether the device supports 4k or a 1080p resolution. The display device type attribute 328 may be used for adapting content based on whether it's viewed on a large screen or a small handheld device. The priority attribute 330 may be used for determining whether the user needs information that is time-critical or may be processed in non-real-time.

In some embodiments, the computing system may be configured to generate and continuously update individual user profiles 302. In some embodiments, the computing system may be configured to collect and use historical user data 306 to generate a personalized user profile 302 for the user. The historical user data 306 may include previous prompts 340, iterative prompt modifications 342, web navigation patterns 344, social media interactions 346, and user-specified configurations 348. The user profile 302 may include attributes for characterizing and understanding the unique preferences, behaviors, and needs of the user. For example, the user profile 302 may include an age attribute 310, a response length attribute 312, a response flavor attribute 314, and a temperature attribute 316. The age attribute 310 may be used to distinguish between a child or adult user, to modulate content appropriateness, etc. The response length attribute 312 may be used to determine whether outputs should be brief or comprehensive. The response flavor attribute 314 may be used for adjusting the tone to be relaxed, professional, etc. based on the user's preference. The temperature attribute 316 may be used to adjust the output style to be more logical or creative based on user preferences.

In some embodiments, the computing system may be configured to examine user reactions to system-generated content to generate metrics 308, such as user engagement time 350, content sections that were appreciated 352, content sections that were found confusing 354, or content sections that garnered other reactions 356.

In some embodiments, the computing system may be configured to distinguish and differentiate between individual user profiles 302 to manage multiple users accessing and using the same user end device.

In some embodiments, the computing system may be configured to use the context 304 information and user profile 302 to transform or translate the user prompt into enhanced prompt or specific instructions, signals, directives, cues, etc. for the LXM system, to generate more relevant LXM-generated content, to modify LXM-generated content, to determine the most suitable model (e.g., LXM) for generating the LXM-generated content, to determine the components of the LXM (e.g., inputs, outputs, models, filters, etc.) that are most suitable for adjustment or modulation, to fine-tuning the LXM operations to better fit the user's needs, etc.

In some embodiments, the computing system may be configured to determine the aspects of feedback on the LXM-produced content that may be inferred autonomously by the sensing hub 174 (illustrated in FIG. 1B) and send or relay the determined aspects of the feedback back to the LXM system.

Generally, user end devices have access to information suitable for determining various user aspects, such as emotions, visual expressions, levels of attention, and satisfaction levels concerning specific generative content. However, the accessibility of this rich user data often remains confined to the user end device, driven by considerations pertaining to privacy, security, and data retrieval latencies. As such, feedback gleaned from the sensing hub's data may be used to refine the content generated by the system. For example, user engagement metrics 308, such as the duration of interaction with the AI-generated content, coupled with insights into which content segments resonated or didn't resonate with the user to determine characteristics such as user satisfaction, confusion, amusement, or any other emotional or cognitive response. This feedback may be initiated implicitly, based on observed behaviors, or explicitly post a user review. Over time, such feedback may improve the content generation capabilities of the system and refine the user profile, leading to more personalized and pertinent interactions in subsequent sessions.

In some embodiments, the computing system may be configured to generate and use user interface statistics 308 to determine the inputs that may be used to better evaluate and the user experience with the LXM. For example, the computing system may use user interface statistics 308 to determine whether a furrowed brow indicates confusion, whether prolonged reading suggests engagement or difficulty, etc. The computing system may be configured to determine a relationship between the user interface statistics 308 and the content output of the LXM system. For example, the computing system may identify a correlation between a measured reduction in the user's heart rate and rendering LXM-generated content that the user finds calming or reassuring.

Figure 4:
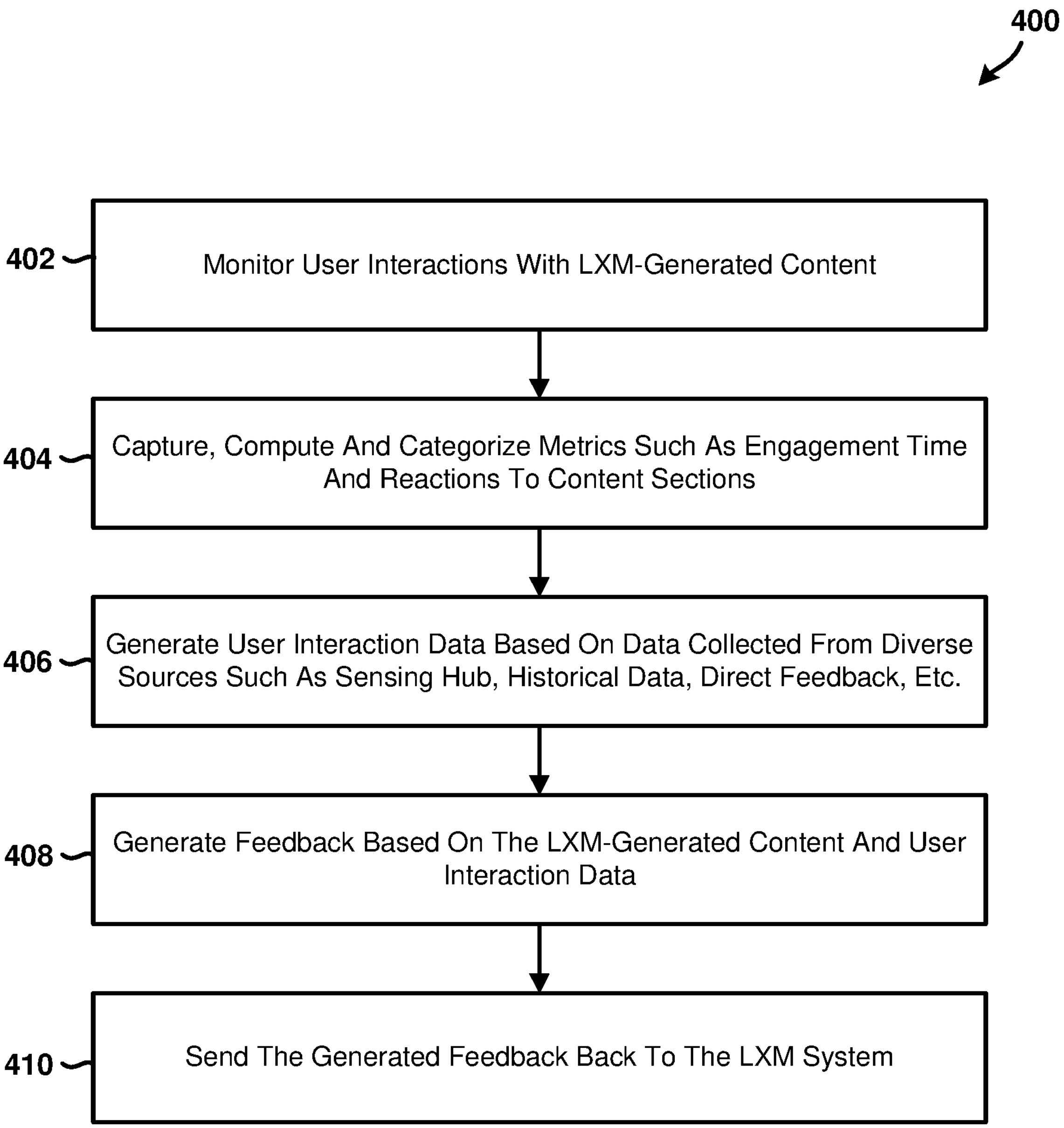
FIG. 4, FIG. 5A and FIG. 5B are process flow diagrams illustrating additional methods of improving the user experience with LXMs in accordance with some embodiments.

FIG. 4 is a process flow diagram illustrating a method 400 of improving the efficacy of and user experience with LXMs in accordance with some embodiments. FIG. 4 extends and complements the methods, components, and information structures illustrated and described with reference to FIGS. 2A-3. With reference to FIGS. 1-4, the method 400 may be performed in a computing device by at least one processor encompassing one or more processors (e.g., 110, 112, 114, 116, 118, 121, 122, 121, 122, 152, 160, 180, etc.), components or subsystems discussed in this application. Means for performing the functions of the operations in the method 400 may include at least one processor including one or more of processors 110, 112, 114, 116, 118, 121, 122, 121, 122, 152, 160, 180, and other components described herein. Further, one or more processors of at least one processor may be configured with software or firmware to perform some or all of the operations of the method 400. In order to encompass the alternative configurations enabled in various embodiments, the hardware implementing any or all of the method 400 is referred to herein as "at least one processor."

For the sake of clarity and ease of presentation, methods 200, 210, 220, 230, 240, and 400 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

With reference to FIGS. 1A-4, in block 402, at least one processor may monitor user interactions with LXM-generated content. For example, the at least one processor may deploy event listeners within the content to record scrolling patterns, use input device trackers to capture clicks or taps on specific sections, employ camera sensors for eye-tracking to determine focus areas, and provide embedded feedback buttons allowing users to directly express their contentment or issues with the content. The at least one processor may aggregate and analyze this collected data to derive meaningful insights into user engagement and preferences. In some embodiments, the monitoring of user interactions with LXM-generated content in block 402 may be performed in conjunction with, or may be the same as or similar as, the observation of user responses to output received from the LXM in block 204 as described with reference to FIGS. 2A-2E.

In block 404, the at least one processor may capture, compute, and categorize metrics such as engagement time and reactions to content sections. For example, the at least one processor may initiate timers to record how long a user remains on a particular section of content, use event listeners to identify and tally specific user actions like highlighting or sharing, and compute averages or trends from the captured data. The at least one processor may sort the results into categories. For example, engagement times may classified into durations such as 'brief', 'moderate', or 'extended', and user reactions may labeled based on their inferred sentiment. In some embodiments, the capturing of metrics in block 404 may be performed in conjunction with the actions performed in block 206 as described with reference to FIGS. 2A-2E to improve user experience based on observed metrics.

In block 406, the at least one processor may generate user interaction data based on data collected from diverse sources such as sensing hub, historical data, direct feedback, etc. For example, the at least one processor may use ambient light sensor data to determine a user's reading environment, reference past interactions to detect patterns in content preferences, and incorporate direct feedback to understand explicit user sentiments. The at least one processor may combine these varied data streams to generate more accurate user interaction data that is reflective of both implicit behaviors and explicit feedback.

In block 408, the at least one processor may generate feedback based on the LXM-generated content and user interaction data. For example, the at least one processor may analyze metrics such as the amount of time a user spends on specific content sections, the frequency of interactions, the speed of scrolling. The at least one processor may also determine and evaluate the ratings and comments associated with the content and compare engagement levels across multiple content pieces. The at least one processor may use the result of this analysis to generate recommendations for adjusting the content's format, style, or depth. In some embodiments, the generation of feedback in block 408 may be performed in conjunction with, or may be the same as or similar as, the operations performed in block 238 as described with reference to FIGS. 2A-2E to provide feedback for fine-tuning the selected LXM.

In block 410, the at least one processor may send the generated feedback back to the LXM system. For example, the at least one processor may generate feedback based on a result of evaluating user reactions to content and detected trends in engagement and send this information to the LXM.

Figure 5A:
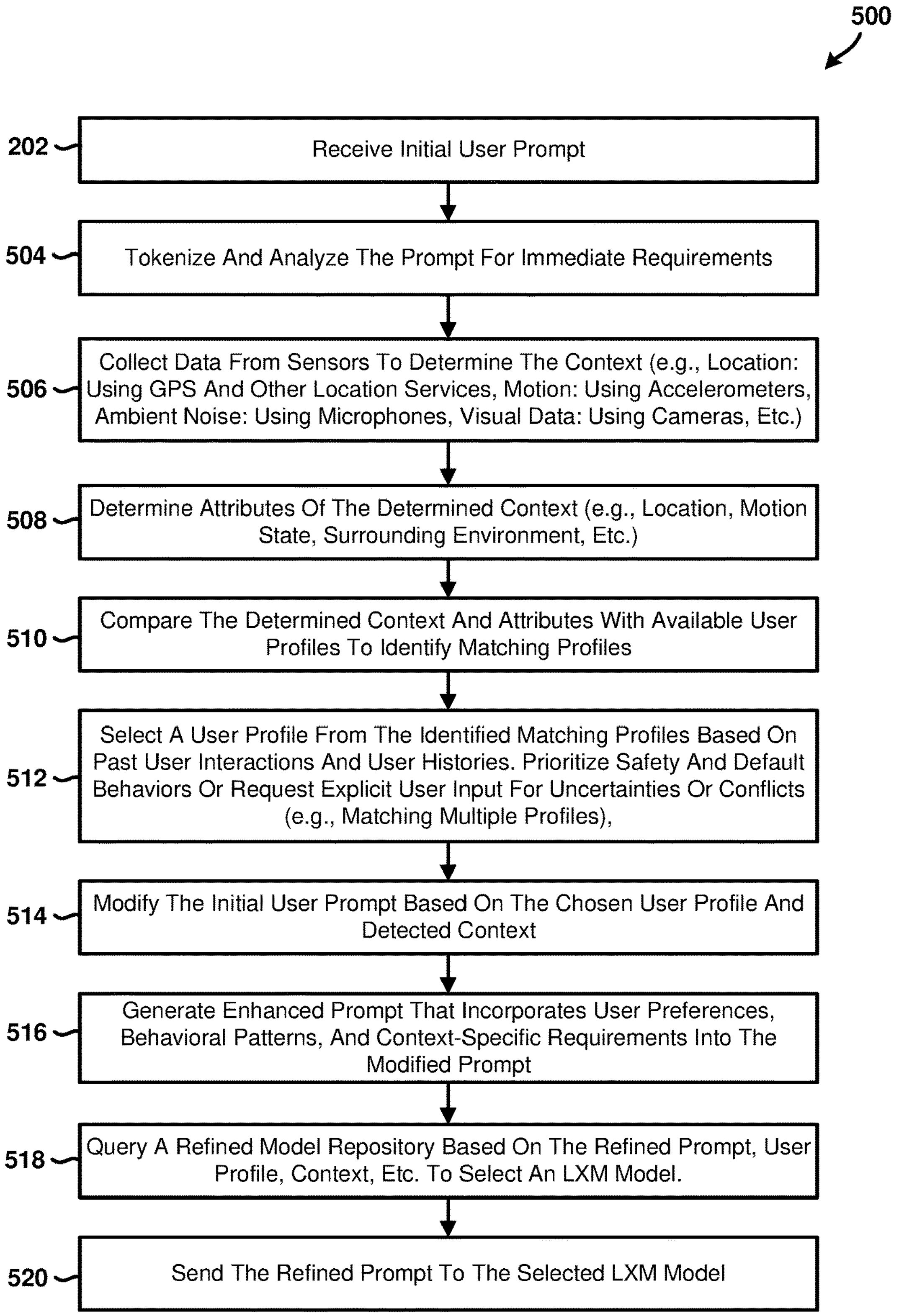
Figure 5B:
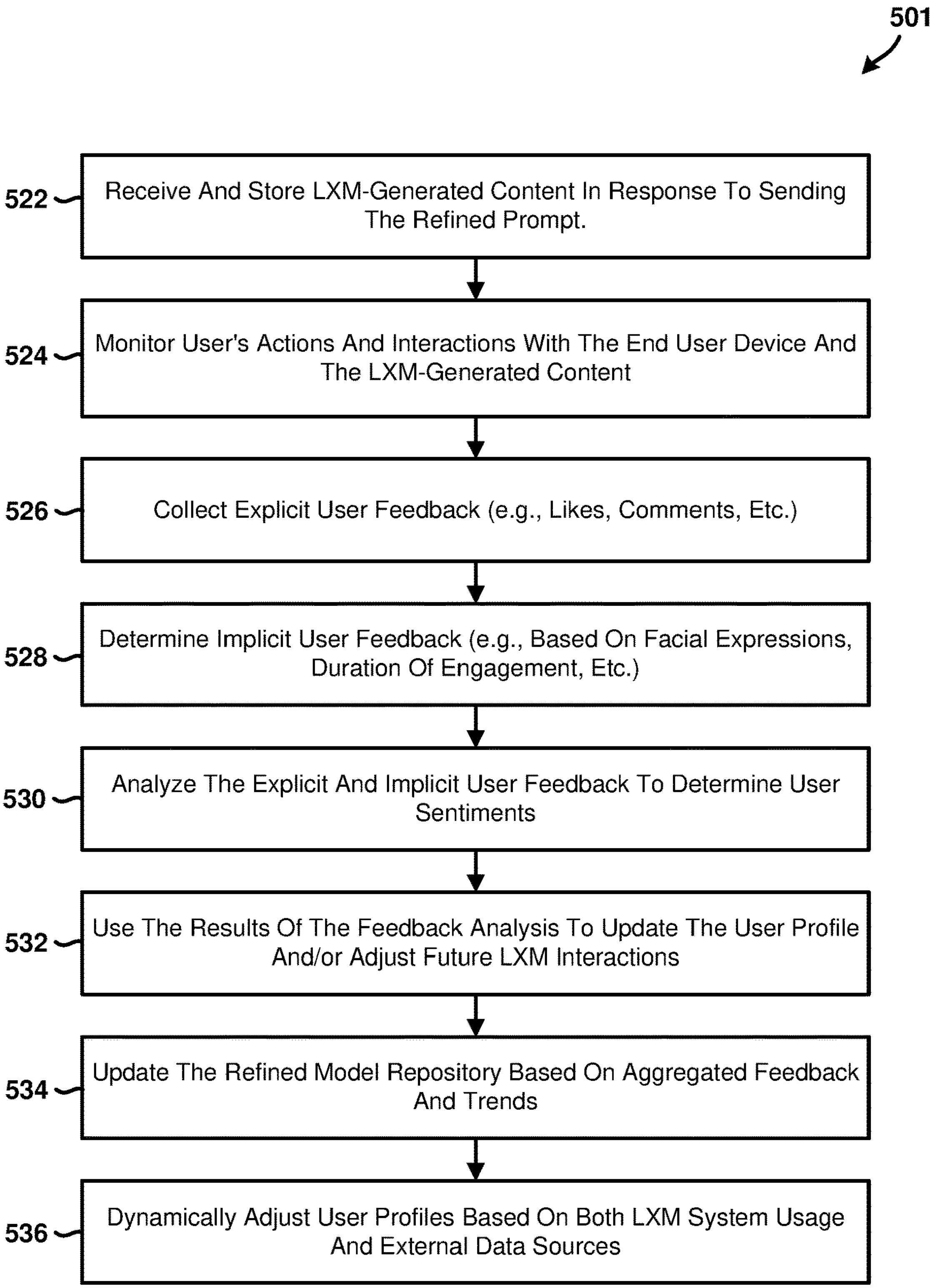

FIGS. 5A and 5B are process flow diagrams illustrating methods 500 and 501 for improving the efficacy of and user experience with LXMs in accordance with some embodiments. FIGS. 5A and 5B may extend and complement the methods, components, and information structures illustrated and described with reference to FIGS. 2A-3. With reference to FIGS. 1-5B, the methods 500, 501 may be performed in a computing device by at least one processor encompassing one or more processors (e.g., 110, 112, 114, 116, 118, 121, 122, 121, 122, 152, 160, 180, etc.), components or subsystems discussed in this application. Means for performing the functions of the operations in the methods 500, 501 may include at least one processor including one or more of processors 110, 112, 114, 116, 118, 121, 122, 121, 122, 152, 160, 180, and other components described herein. Further, one or more processors of at least one processor may be configured with software or firmware to perform some or all of the operations of the methods 500, 501. In order to encompass the alternative configurations enabled in various embodiments, the hardware implementing any or all of the method 500 is referred to herein as "at least one processor."

For the sake of clarity and ease of presentation, methods 200, 210, 220, 230, 240, 400, 500 and 501 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

In block 202, the at least one processor may receive an initial user prompt as described for the like numbered block on the method 200 as described.

In block 504, the at least one processor may tokenize and analyze the prompt for immediate requirements. For example, the at least one processor may decompose a user's request into individual tokens and assess each token to discern specific criteria or preferences mentioned by the user. These tokenization operations may allow the at least one processor to more readily identify the content and intent of the user's prompt and/or may allow the system to take more relevant actions. In some embodiments, the tokenizing and analyzing the prompt in block 504 may include accessing and using the user profile 302 and context 304 information illustrated and described with reference to FIG. 3.

In block 506, the at least one processor may collect data from sensors to determine the context (e.g., location using Global Positioning System (GPS) and other location services, motion using accelerometers, ambient noise using microphones, visual data using cameras, etc.). For example, the at least one processor may use the GPS sensor to determine the user's geographic coordinates when they request location-specific information. As another example, the at least one processor may use the accelerometer to determine the user's activity level and generate fitness-related feedback.

In block 508, the at least one processor may determine various attributes for the determined context (e.g., location, motion state, surrounding environment, etc.). For example, the at least one processor may analyze GPS data to determine whether the user is in a park or a shopping mall, evaluate accelerometer readings to determine whether the user is stationary or moving, use environmental sensors to determine ambient light levels, etc. In some embodiments, the operations in blocks 506 and 508 may be performed in conjunction with, or may be the same as or similar to, the operations for obtaining user context information in blocks 212 and 232 as described with reference to FIGS. 2A-2E.

In block 510, the at least one processor may compare the determined context and attributes with available user profiles to identify matching profiles. For example, the at least one processor may evaluate the user's current location and time against predefined profiles in a smart home setting to determine the most appropriate profile to select for the current user prompt.

In block 512, the at least one processor may select a user profile from the identified matching profiles based on past user interactions and user histories. For example, the at least one processor may automatically activate a frequently chosen setting during a specific time frame to determine the user's habitual selections. In some embodiments, the at least one processor may prioritize safety and default behaviors or request explicit user input for uncertainties or conflicts (e.g., matching multiple profiles). For example, the at least one processor may choose a safety-focused profile in a vehicle scenario over entertainment options or prompt the user to confirm their preferred choice in response to not being able to determine whether the user is driving or a passenger in a vehicle. In some embodiments, the operations in blocks 510 and 512 for selecting a user profile based on context and past interactions may be performed in conjunction with, or may be the same as or similar as, the operations for selecting a user profile based on user context information and the user prompt in block 214 as described with reference to FIGS. 2A-2E.

In block 514, the at least one processor may modify the initial user prompt based on the chosen user profile and detected context. For example, the at least one processor may determine based on the a user profile that the user is a "history teacher" and determine from the context that the user is "preparing for a class." In response, the at least one processor may modify the initial prompt "Tell me about World War II," to "Provide a detailed lesson plan on World War II suitable for a high school history class."

In block 516, the at least one processor may incorporate user preferences, behavioral patterns, and context-specific requirements into the modified prompt. For example, the at least one processor may determine a user preference for vegetarian recipes, identify a behavioral pattern that they frequently search for quick meals, and based on the context that they are currently at work with limited time, modify the initial prompt "Suggest a recipe" to "Recommend a quick vegetarian recipe suitable for a lunch break." As further examples, the at least one processor may modify an initial prompt of "update on stock market" to "Provide a brief audio summary of today's stock market performance" in response to determining User Preference "Prefers listening over reading," Behavioral Pattern "Often uses voice commands," Context-Information "Is currently driving." The at least one processor may modify an initial prompt of "Suggest a book" to "recommend a bestselling historical fiction novel suitable for reading on a long flight" in response to determining User Preference "enjoys historical fiction," Behavioral Pattern "frequently searches for historical periods" and Context-Information "is preparing for a long flight."

In block 518, the at least one processor may query a refined model repository based on the refined prompt, user profile, context, etc. to select an LXM model. For example, the at least one processor may select an LXM model from the repository that is specifically fine-tuned for detailed academic content enhanced with visual elements in response to generating an enhanced prompt requesting a "deep dive into marine biology," determining based on the user profile that the user prefers academic content with visual aids, and determining based on the context information that the user is using a high-resolution desktop screen. As another example, the at least one processor may select an LXM model from the repository that is fine-tuned for historical fiction book recommendations in response to generating an enhanced prompt requesting a "recommend a historical fiction novel suitable for reading on a long flight," determining based on the user profile that the user is a frequent traveler that prefers historical fiction, and determining based on the context information that the user is preparing for an international flight.

In block 520, the at least one processor may send the refined prompt to the selected LXM model. For example, the at least one processor may generate an enhanced prompt asking for "safety precautions for do-it-yourself (DIY) home electrical repairs," identify a relevant LXM model trained on home improvement and safety guidelines, and forward the prompt to the selected model specialized knowledge, which may generate a detailed list of safety measures tailored to DIY electrical tasks.

With reference to FIGS. 1A-5B and method 501, in block 522, the at least one processor may receive and store the LXM-generated content in response to sending the refined prompt. Storing the LXM-generated content may allow the at least one processor to provide rapid access to the information for future reference without re-querying the LXM model. In addition, storing LXM-generated content may allow for tracking and analyzing user interactions over time, which may be used for feedback and/or to refine and improve the LXM's future responses.

In block 524, the at least one processor may monitor user's actions and interactions with the end-user device and the LXM-generated content. The at least one processor may also use algorithms such as person/face detection, object recognition, and emotional assessment to further refine user interactions. For example, the at least one processor may recognize a user through face detection when they activate the device, and based on their previous interactions with LXM-generated content on "sustainable living," offer them a new article on sustainable energy solutions. Concurrently, if the camera detects a solar panel in the user's environment through object recognition, the system might prioritize content related to solar energy. If the user appears enthusiastic or nods in agreement through emotional assessment, subsequent content might delve deeper into the benefits and installation procedures of solar panels.

In block 526, the at least one processor may collect explicit user feedback (e.g., likes, comments, etc.). For example, the at least one processor may present a series of images to a user as part of an art appreciation module. After viewing each image, the user may be presented with the option to like, dislike, or leave a comment. A liked image may result in the at least one processor offering more artwork from the same artist or similar style in subsequent sessions, while a comment indicating a preference for a specific art movement may guide the at least one processor to present more content related to that movement in the future.

In block 528, the at least one processor may determine implicit user feedback (e.g., based on facial expressions, duration of engagement, etc.). The at least one processor may determine implicit user feedback by analyzing indirect cues that users give while engaging with content or using a device. Unlike explicit feedback in which users directly voice their preferences or dissatisfaction, implicit feedback may be inferred from users' behaviors and interactions. This feedback may be valuable as it often characterizes genuine, unfiltered reactions that allow the system refine its operations without any proactive user input. For example, the at least one processor may employ an integrated camera to monitor a user's facial reactions while they're watching a tutorial video. If the system detects frequent squinting, it could infer that the text or visuals might be too small or unclear. Similarly, a smile may indicate the user is enjoying the content, a frown might indicate dissatisfaction or confusion, etc. As another example, if the system observes that a user paused the video at specific segments and took notes, it might deduce that those segments are particularly valuable or challenging. If a user spends a long time on a specific article or video, the system might infer that the content was engaging or of interest to the user.

In block 530, the at least one processor may analyze the explicit and implicit user feedback to determine user sentiments. For example, the at least one processor may evaluate the frequency of likes or thumbs-up on a particular article and simultaneously measure the average duration users spend reading that article. If both explicit likes and prolonged reading durations are high, the system may determine with a high degree of confidence that the article resonates well with the audience. Conversely, if the article receives numerous likes but is seldom read in its entirety, the system may determine that while the topic is of interest the content presentation or depth needs adjustment.

In block 532, the at least one processor may use the results of the feedback analysis to update the user profile and/or adjust future LXM interactions. For example, the at least one processor may prioritize the generation or recommendation of more graphically rich content in response to identifying a recurring pattern of a user favoring interactive graphics over textual content. The system may adjust future video recommendations to slower-paced content or supplement videos with textual explanations in response to feedback indicating that a user frequently pauses or replays video content suggesting difficulty in comprehension or pacing issues. The system may prioritize space-related topics in future LXM interactions in response to determining that the user consistently provides positive feedback for articles related to space exploration and spends a longer duration on such content. In some embodiments, the operations for updating user profiles based on feedback analysis in block 532 may be performed in conjunction with, or may be the same or similar to, the operations in block 219 as described with reference to FIGS. 2A-2E for updating a selected user profile based on observed responses.

In block 534, the at least one processor may update the refined model repository based on aggregated feedback and trends. For example, the at least one processor may introduce newer models adept at generating content on sustainable energy in response to detecting a surge in user interactions related to sustainable energy solutions. As another example, the at least one processor may replace a model in response to consistently receiving negative feedback regarding the accuracy or relevance of its content.

In block 536, the at least one processor may dynamically adjust user profiles based on both LXM system usage and external data sources. For example, the at least one processor may determine based on the user profile and context information that a user frequently reads articles on a specific topic within the LXM system. The at least one processor may also determine based on information collected from external news platforms that the same user shows a keen interest in related global events. The at least one processor may use this information to refine the user's profile to offer even more contextually relevant content in subsequent LXM interactions.

Figure 6:
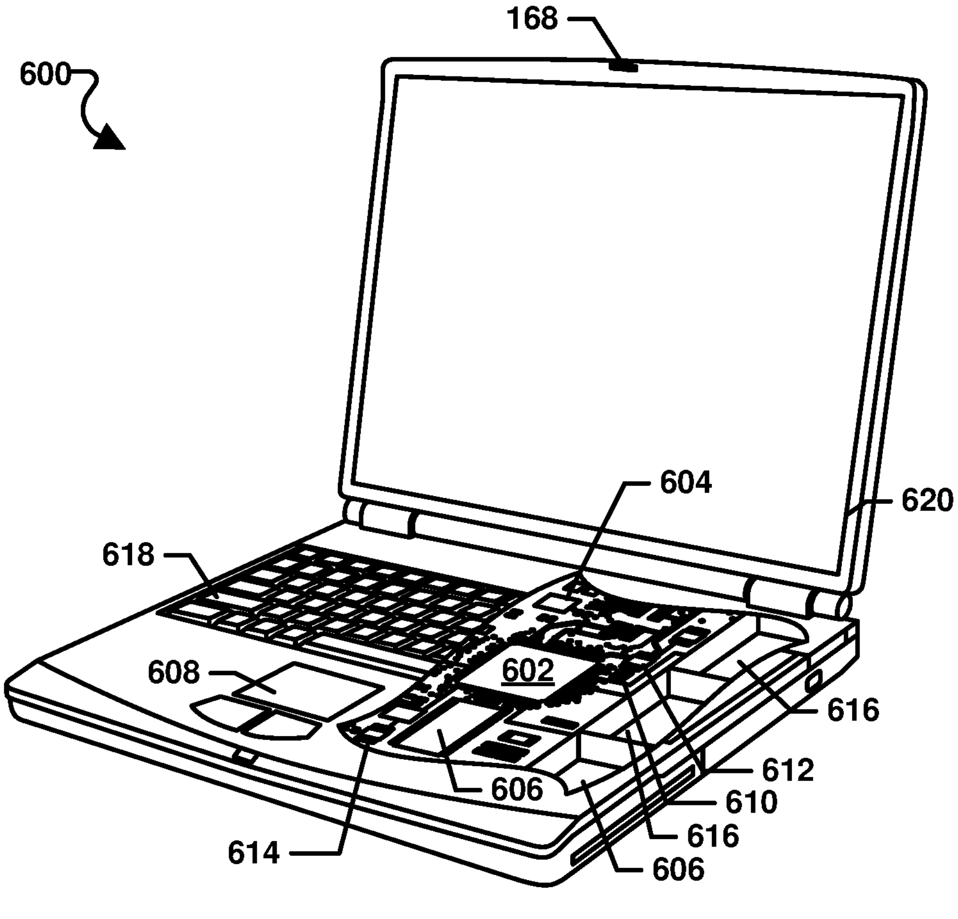
FIG. 6 is a component block diagram illustrating an example computing device in the form of a laptop that is suitable for implementing some embodiments.

Various embodiments (including, but not limited to, embodiments described above with reference to FIGS. 1-5) may be implemented in a wide variety of wireless devices and computing systems including a laptop computer 500, an example of which is illustrated in FIG. 6. With reference to FIGS. 1-6, a laptop computer may include a processor 602 coupled to volatile memory 604 and a large capacity nonvolatile memory, such as a disk drive 606 of Flash memory. The laptop computer 600 may include a touchpad touch surface 608 that serves as the computer's pointing device, and thus may receive drag, scroll, and flick gestures. Additionally, the laptop computer 600 may have one or more antenna 610 for sending and receiving electromagnetic radiation that may be connected to a wireless data link and/or cellular telephone transceiver 612 coupled to the processor 602. The computer 600 may also include a BT transceiver 614, a compact disc (CD) drive 616, a keyboard 618, and a display 620 all coupled to the processor 602. Other configurations of the computing device may include a computer mouse or trackball coupled to the processor (e.g., via a universal serial bus (USB) input) as are well known, which may also be used in conjunction with various embodiments.

Figure 7:
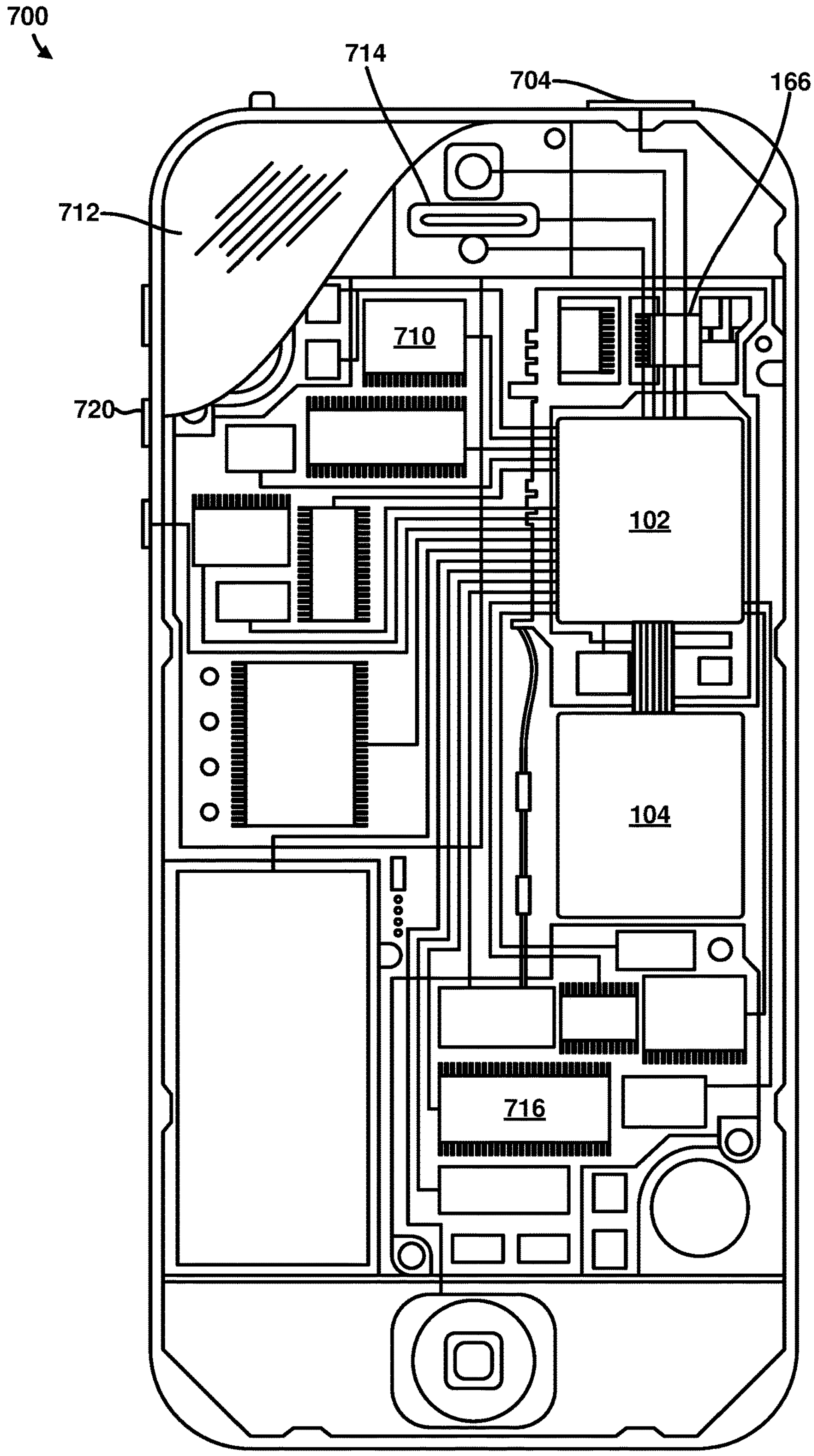
FIG. 7 is a component block diagram illustrating an example wireless communication device suitable for use with various embodiments.

FIG. 7 is a component block diagram of a computing device 700 suitable for use with various embodiments. With reference to FIGS. 1-7, various embodiments may be implemented on a variety of computing devices 700, an example of which is illustrated in FIG. 7 in the form of a smartphone. The computing device 700 may include a first SOC 102 coupled to a second SOC 104. The first and second SoCs 102, 104 may be coupled to internal memory 716, a display 712, and to a speaker 714. The first and second SOCs 102, 104 may also be coupled to at least one subscriber identity module (SIM) 740 and/or a SIM interface that may store information supporting a first 5GNR subscription and a second 5GNR subscription, which support service on a 5G non-standalone (NSA) network.

The computing device 700 may include an antenna 704 for sending and receiving electromagnetic radiation that may be connected to a wireless transceiver 166 coupled to one or more processors in the first and/or second SOCs 102, 104. The computing device 700 may also include menu selection buttons or rocker switches 720 for receiving user inputs.

The computing device 700 also includes a sound encoding/decoding (CODEC) circuit 710, which digitizes sound received from a microphone into data packets suitable for wireless transmission and decodes received sound data packets to generate analog signals that are provided to the speaker to generate sound. Also, one or more of the processors in the first and second circuitries 102, 104, wireless transceiver 166 and CODEC 710 may include a digital signal processor (DSP) circuit (not shown separately).

Figure 8:
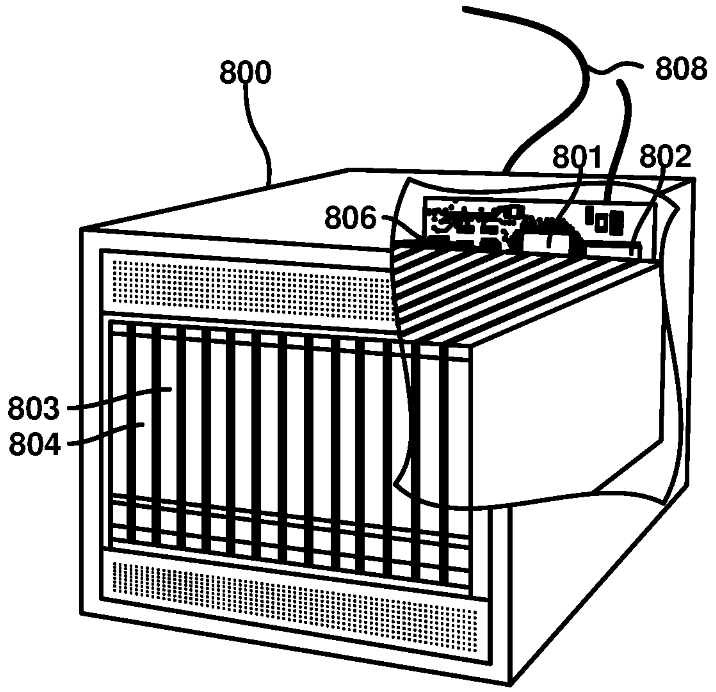
FIG. 8 is a component diagram of an example server suitable for implementing some embodiments.

Some embodiments may be implemented on any of a variety of commercially available computing devices, such as the server computing device 800 illustrated in FIG. 8. Such a server device 800 may include a processor 801 coupled to volatile memory 802 and a large capacity nonvolatile memory, such as a disk drive 803. The server device 800 may also include a floppy disc drive, USB, etc. coupled to the processor 801. The server device 800 may also include network access ports 806 coupled to the processor 801 for establishing data connections with a network connection circuit 804 and a communication network 808 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method performed by a computing device for improving the user experience with LXMs, including receiving a user's prompt, observing user responses to an output received from a LXM in response to a prompt that is at least partially based on the user's prompt, and taking an action to improve the user's experience with the LXM based on the observed user response.

Example 2: The method of example 1, further including obtaining user context information from a source of physical context information in the computing device, selecting a user profile from among a plurality of user profiles based on the user context information and the user's prompt, generating an enhanced prompt based on the user's prompt and information included in the selected user profile, and submitting the enhanced prompt to the LXM, in which taking an action to improve the user's experience with the LXM includes updating the selected user profile based on the observed user response.

Example 3: The method of example 2, further including identifying, based on observing user responses, one or more portions of the output received from the LXM that elicited positive, negative, or neutral user responses, submitting a prompt to the LXM inquiring about prompt parameters or content characteristics that resulted in positive, negative, or neutral user responses of the identified one or more portions of the output, and updating the selected user profile based on information on prompt parameters received from the LXM to include or increase prompt parameters that elicited positive user responses and remove or reduce prompt parameters that elicited negative user responses.

Example 4: The method of any of examples 1-3, further including obtaining user context information from a source of physical context information in the computing device, selecting a LXM from a plurality of LXMs based on the user context information and the user's prompt, and submitting to the selected a prompt that is at least partially based on the user's prompt, in which taking an action to improve the user's experience with the LXM includes providing feedback configured to enable fine tuning of the selected LXM based on the observed user response to the output received from the selected LXM.

Example 5: The method of example 4, in which the selected LXM is hosted on the computing device, the method further including fine tuning the selected LXM on the computing device based on the observed user response to the output received from the selected LXM.

Example 6: The method of example 4, in which the plurality of LXMs are adapted for different user profiles and user context.

Example 7: The method of example 4, further including determining a location of the user based on the user context information, in which selecting a LXM from a plurality of LXMs based on the user context information and the user's prompt includes selecting one of the plurality of LXMs that is adapted for the determined location of the user.

Example 8: The method of example 4, further including determining an activity of the user based on the user context information, in which selecting a LXM from a plurality of LXMs based on the user context information and the user's prompt includes selecting one of the plurality of LXMs that is adapted for the determined activity of the user.

Example 9: The method of any of examples 1-8, further including obtaining user context information from a source of physical context information in the computing device, selecting a user profile from among a plurality of user profiles based on the user context information and the user's prompt, selecting a LXM from a plurality of LXMs based on the user context information and the user's prompt, generating an enhanced prompt based on the user's prompt, information included in the selected user profile, and the selected LXM, and submitting the enhanced prompt to the selected LXM, in which taking an action to improve the user's experience with the LXM includes updating the selected user profile based on the observed user response, and providing feedback configured to enable fine tuning of the selected LXM based on the observed user response.

Example 10: The method of any of examples 1-9, in which the LXM is an LLM.

As used in this application, terminology such as "component," "module," "system," etc., is intended to encompass a computer-related entity. These entities may involve, among other possibilities, hardware, firmware, a blend of hardware and software, software alone, or software in an operational state. As examples, a component may encompass a running process on a processor, the processor itself, an object, an executable file, a thread of execution, a program, or a computing device. To illustrate further, both an application operating on a computing device and the computing device itself may be designated as a component. A component might be situated within a single process or thread of execution or could be distributed across multiple processors or cores. In addition, these components may operate based on various non-volatile computer-readable media that store diverse instructions and/or data structures. Communication between components may take place through local or remote processes, function, or procedure calls, electronic signaling, data packet exchanges, memory interactions, among other known methods of network, computer, processor, or process-related communications.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:

a processing system configured to:

receive a user prompt;

select a large generative artificial intelligence model (LXM) from a plurality of LXMs based on user context information associated with a user providing the user prompt;

generate a prompt based on the user prompt;

observe user responses of a user to an output received from the LXM in response to the prompt;

categorize the user responses based on detected visual cues of the user, wherein the visual cues include at least one of facial expressions of the user or gaze direction of the user;

identify, based on the categorization, one or more portions of the output that elicited the categorized user responses;

inquire the LXM about prompt parameters or content characteristics of the prompt that caused the identified one or more portions of the output to elicit the categorized user responses; and update a selected user profile based on information on prompt parameters received from the LXM to include or increase prompt parameters that elicited the user responses.

2. The computing device of claim 1, wherein the processing system is further configured to:

obtain user context information from a source of physical context information in the computing device;

select a user profile from among a plurality of user profiles based on the user context information and the user prompt;

generate an enhanced prompt based on the user prompt and information included in the selected user profile;

submit the enhanced prompt to the LXM; and update the selected user profile based on the observed user responses.

3. The computing device of claim 1, wherein the processing system is further configured to:

obtain user context information from a source of physical context information in the computing device;

submit to the selected LXM the prompt; and provide feedback configured to enable fine tuning of the selected LXM based on the observed user responses to the output received from the selected LXM.

4. The computing device of claim 3, wherein the selected LXM is hosted on the computing device and the processing system is further configured to fine tune the selected LXM on the computing device based on the observed user responses to the output received from the selected LXM.

5. The computing device of claim 3, wherein the plurality of LXMs are adapted for different user profiles and user context.

6. The computing device of claim 3, wherein the processing system is further configured to:

determine a location of the user based on the user context information; and select the LXM from the plurality of LXMs based on the user context information and the user prompt by selecting one of the plurality of LXMs that is adapted for the determined location of the user.

7. The computing device of claim 3, wherein the processing system is further configured to:

determine an activity of the user based on the user context information; and select a LXM from a plurality of LXMs based on the user context information and the user prompt by selecting one of the plurality of LXMs that is adapted for the determined activity of the user.

8. The computing device of claim 1, wherein the processing system is further configured to:

obtain the user context information from a source of physical context information in the computing device;

select a user profile from among a plurality of user profiles based on the user context information and the user prompt;

generate an enhanced prompt based on the user prompt, information included in the selected user profile, and the selected LXM;

submit the enhanced prompt to the selected LXM; and update the selected user profile based on the observed user responses, and providing feedback configured to enable fine tuning of the selected LXM based on the observed user responses.

9. The computing device of claim 1, wherein the processing system is further configured to:

generate a subsequent prompt based on the updated selected user profile.

10. A method performed by a computing device comprising:

receiving a user prompt;

selecting a large generative artificial intelligence model (LXM) from a plurality of LXMs based on user context information associated with a user providing the user prompt;

generating a prompt based on the user prompt;

observing user responses of a user to an output received from the LXM in response to the prompt;

categorizing the user responses based on detected visual cues of the user, wherein the visual cues include at least one of facial expressions of the user or gaze direction of the user;

identifying, based on the categorization, one or more portions of the output that elicited the categorized user responses;

inquiring the LXM about prompt parameters or content characteristics of the prompt that caused the identified one or more portions of the output to elicit the categorized user responses; and updating a selected user profile based on information on prompt parameters received from the LXM to include or increase prompt parameters that elicited the user responses.

11. The method of claim 10, further comprising:

obtaining user context information from a source of physical context information in the computing device;

selecting a user profile from among a plurality of user profiles based on the user context information and the user prompt;

generating an enhanced prompt based on the user prompt and information included in the selected user profile;

submitting the enhanced prompt to the LXM; and updating the selected user profile based on the observed user responses.

12. The method of claim 10, further comprising:

obtaining the user context information from a source of physical context information in the computing device;

submitting to the selected LXM the prompt; and providing feedback configured to enable fine tuning of the selected LXM based on the observed user responses to the output received from the selected LXM.

13. The method of claim 12, wherein the selected LXM is hosted on the computing device, the method further comprising fine tuning the selected LXM on the computing device based on the observed user responses to the output received from the selected LXM.

14. The method of claim 12, wherein the plurality of LXMs are adapted for different user profiles and user context.

15. The method of claim 12, further comprising determining a location of the user based on the user context information, wherein selecting an LXM from the plurality of LXMs based on the user context information and the user prompt comprises selecting one of the plurality of LXMs that is adapted for the determined location of the user.

16. The method of claim 12, further comprising determining an activity of the user based on the user context information, wherein selecting a LXM from the plurality of LXMs based on the user context information and the user prompt comprises selecting one of the plurality of LXMs that is adapted for the determined activity of the user.

17. The method of claim 10, further comprising:

obtaining the user context information from a source of physical context information in the computing device;

selecting a user profile from among a plurality of user profiles based on the user context information and the user prompt;

generating an enhanced prompt based on the user prompt, information included in the selected user profile, and the selected LXM;

submitting the enhanced prompt to the selected LXM; and updating the selected user profile based on the observed user responses, and providing feedback configured to enable fine tuning of the selected LXM based on the observed user responses.

18. A computing device, comprising:

means for receiving a user prompt;

means for selecting a large generative artificial intelligence model (LXM) from a plurality of LXMs based on user context information associated with a user providing the user prompt;

means for generating a prompt based on the user prompt;

means for observing user responses of a user to an output received from in response to the prompt;

means for categorizing the user responses based on detected visual cues of the user, wherein the visual cues include at least one of facial expressions of the user or gaze direction of the user;

means for identifying, based on the categorization, one or more portions of the output that elicited the categorized user responses;

means for inquiring the LXM about prompt parameters or content characteristics that caused the identified one or more portions of the output to elicit the categorized user responses; and means for updating a selected user profile based on information on prompt parameters received from the LXM to include or increase prompt parameters that elicited the user responses.

19. The computing device of claim 18, further comprising:

means for obtaining the user context information from a source of physical context information in the computing device;

means for generating an enhanced prompt based on the user prompt and information included in the selected user profile;

means for submitting the enhanced prompt to the LXM, and means for updating the selected user profile based on the observed user responses.

20. The computing device of claim 18, further comprising:

means for obtaining the user context information from a source of physical context information in the computing device;

means for submitting to the selected LXM the prompt; and means for providing feedback configured to enable fine tuning of the selected LXM based on the observed user responses to the output received from the selected LXM.

21. The computing device of claim 20, wherein the selected LXM is hosted on the computing device, and further comprising means for fine tuning the selected LXM on the computing device based on the observed user responses to the output received from the selected LXM.

22. The computing device of claim 20, wherein the plurality of LXMs are adapted for different user profiles and user context.

23. The computing device of claim 20, further comprising means for determining a location of the user based on the user context information, wherein means for selecting the LXM from the plurality of LXMs based on the user context information and the user prompt comprises means for selecting one of the plurality of LXMs that is adapted for the determined location of the user.

24. The computing device of claim 20, further comprising means for determining an activity of the user based on the user context information, wherein the means for selecting the LXM from the plurality of LXMs based on the user context information and the user prompt comprises means for selecting one of the plurality of LXMs that is adapted for the determined activity of the user.

25. The computing device of claim 18, further comprising:

means for obtaining user context information from a source of physical context information in the computing device;

means for selecting a user profile from among a plurality of user profiles based on the user context information and the user prompt;

means for generating an enhanced prompt based on the user prompt, information included in the selected user profile, and the selected LXM;

means for submitting the enhanced prompt to the selected LXM; and means for updating the selected user profile based on the observed user responses, and means for providing feedback configured to enable fine tuning of the selected LXM based on the observed user responses.

26. A non-transitory processor readable media having stored thereon processor-executable instructions configured to cause a processing system of a computing device to perform operations comprising:

receiving a user prompt;

selecting a large generative artificial intelligence model (LXM) from a plurality of LXMs based on user context information associated with a user providing the user prompt;

generating a prompt based on the user prompt;

observing user responses of a user to an output received from the LXM in response to the prompt;

categorizing the user responses based on detected visual cues of the user, wherein the visual cues include at least one of facial expressions of the user or gaze direction of the user;

identifying, based on the categorization, one or more portions of the output that elicited the categorized user responses;

inquiring the LXM about prompt parameters or content characteristics of the prompt that caused the identified one or more portions of the output to elicit the categorized user responses; and updating a selected user profile based on information on prompt parameters received from the LXM to include or increase prompt parameters that elicited the user responses.

27. The non-transitory processor readable media of claim 26, wherein:

the stored processor-executable instructions are configured to cause the processing system to perform operations further comprising:

obtaining user context information from a source of physical context information in the computing device;

selecting a user profile from among a plurality of user profiles based on the user context information and the user prompt;

generating an enhanced prompt based on the user prompt and information included in the selected user profile;

submitting the enhanced prompt to the LXM; and updating the selected user profile based on the observed user responses.

28. The non-transitory processor readable media of claim 26, the stored processor-executable instructions are configured to cause the processing system to perform operations further comprising:

obtaining user context information from a source of physical context information in the computing device;

submitting to the selected LXM the prompt; and providing feedback configured to enable fine tuning of the selected LXM based on the observed user responses to the output received from the selected LXM.

29. The non-transitory processor readable media of claim 28, wherein the selected LXM is hosted on the computing device and the stored processor-executable instructions are configured to cause the processing system to perform operations further comprising fine tuning the selected LXM on the computing device based on the observed user responses to the output received from the selected LXM.

30. The non-transitory processor readable media of claim 28, wherein the plurality of LXMs are adapted for different user profiles and user context.

* * * * *